July 20, 1965 J. M. PUGMIRE 3,196,260

ADDER

Filed May 3, 1961 14 Sheets-Sheet 1

INVENTOR
JOHN M. PUGMIRE
BY Carl C. Kling
ATTORNEY

July 20, 1965 J. M. PUGMIRE 3,196,260

ADDER

Filed May 3, 1961 14 Sheets-Sheet 2

FIG. 4

| INSTRUCTION WORD | | | | | | | | | | |
|---|---|---|---|---|---|---|---|---|---|---|
| OPERATION CODE S INDICATES SIGN | | | INDEXING WORD | | CONTROL | | ADDRESS | | | |
| S | 0 | 1 | 2 | 3 | 4 | 5 | 6 | 7 | 8 | 9 |
| 0 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 | 0 1 2 3 6 |
| DATA WORD | | | | | | | | | | |

FIG. 5

| DECIMAL DIGIT | 2/5 CODE 0 | 1 | 2 | 3 | 6 | DECIMAL 9'S COMPLEMENT |
|---|---|---|---|---|---|---|
| 1 | X | X | | | | 8 |
| 2 | X | | X | | | 7 |
| 3 | X | | | X | | 6 |
| 4 | | X | | X | | 5 |
| 5 | | | X | X | | 4 |
| 6 | X | | | | X | 3 |
| 7 | | X | | | X | 2 |
| 8 | | | X | | X | 1 |
| 9 | | | | X | X | 0 |
| 0 | | X | X | | | 9 |

FIG. 6a

| | | 0 | 1 | 2 | 3 | 6 |
|---|---|---|---|---|---|---|
| Y | DEC 4 | 0 | 1 | 0 | 1 | 0 |
| Z | DEC 2 | 1 | 0 | 1 | 0 | 0 |
| P | | 1 | 1 | 1 | 1 | 0 |
| G | | 0 | 0 | 0 | 0 | 0 |

Pi; Pj; Pk; Pl

FIG. 6b

| | | 0 | 1 | 2 | 3 | 6 |
|---|---|---|---|---|---|---|
| Y | DEC 4 | 0 | 1 | 0 | 1 | 0 |
| Z | DEC 3 | 0 | 1 | 1 | 0 | 0 |
| P | | 0 | 1 | 1 | 1 | 0 |
| G | | 0 | 1 | 0 | 0 | 0 |

Gj; (Pj); Pk; Pl

FIG. 6c

| | | 0 | 1 | 2 | 3 | 6 |
|---|---|---|---|---|---|---|
| Y | DEC 4 | 0 | 1 | 0 | 1 | 0 |
| Z | DEC 4 | 0 | 1 | 0 | 1 | 0 |
| P | | 0 | 1 | 0 | 1 | 0 |
| G | | 0 | 1 | 0 | 1 | 0 |

Gi; Gj; (Pi; Pj)

FIG. 7

| | Gi : Gj | Gi : Pj : Pk | | Pi : Pj : Pk : Pl | |
|---|---|---|---|---|---|
| | 0 1 2 3 6 | 0 1 2 3 6 | 0 1 2 3 6 | 0 1 2 3 6 | 0 1 2 3 6 |
| Y<br>Z | 0 1 0 1 0<br>0 1 0 1 0 | 0 1 0 0 1<br>0 0 1 0 1 | 1 1 0 0 0<br>0 0 0 1 1 | 1 1 0 0 0<br>0 0 1 1 0 | 0 1 1 0 0<br>1 0 0 1 0 |
| Y<br>Z | | | 1 0 0 1 0<br>0 1 0 0 1 | 0 1 0 1 0<br>1 0 1 0 0 | |
| Y<br>Z | | | 0 1 0 1 0<br>1 0 0 0 1 | | |
| P<br>G | 0 1 0 1 0<br>0 1 0 1 0 | 0 1 1 0 1<br>0 0 0 0 1 | 1 1 0 1 1<br>0 0 0 0 0 | 1 1 1 1 0<br>0 0 0 0 0 | 1 1 1 1 0<br>0 0 0 0 0 |
| COMBINATIONS SPECIFIED BY FUNCTION | 4 + 4 = 8 | 7 + 8 = 15<br>8 + 7 = 15 | 1 + 9 = 10<br>9 + 1 = 10<br>3 + 7 = 10<br>7 + 3 = 10<br>4 + 6 = 10<br>6 + 4 = 10 | 1 + 5 = 6<br>5 + 1 = 6<br>2 + 4 = 6<br>4 + 2 = 6 | 0 + 3 = 3<br>3 + 0 = 3 |
| SUMMATION FUNCTION | P1 G1 G3 P3 | G6 P6 P1 P2 | P0 P1 P3 P6 | P0 P1 P2 P3 | P0 P1 P2 P3 |
| FUNCTION USED IN COMBINER | G1 G3 | G6 P1 P2 | P0 P1 P3 P6 | P0 P1 P2 P3 $\bar{0}$ | P0 P3 0 |
| RAW SUM | 8 | 5* | 0* | 6 | 3 |

FIG. 8

| Y ↓ \ Z → | 0 | 1 | 2 | 3 | 4 | 5 | 6 | 7 | 8 | 9 |
|---|---|---|---|---|---|---|---|---|---|---|
| 0 | G1<br>G2 | G1<br>P0 P2 | G2<br>P0 P1 | P0 P3<br>0 | G1<br>P2 P3 | G2<br>P1 P3 | P0 P6<br>0 | G1<br>P2 P6 | G2<br>P1 P6 | P3 P6<br>0 |
| 1 | | G0<br>G1 | G0<br>P1 P2 | G0<br>P1 P3 | G1<br>P0 P3 | P0 P1<br>P2 ● P3<br>$\bar{0}$ | G0<br>P1 P6 | G1<br>P0 P6 | P0 P1<br>P2 ● P6<br>$\bar{0}$ | P0 P1<br>♦<br>P3 P6 |
| 2 | | | G0<br>G2 | G0<br>P2 P3 | P0 P1<br>P2 ● P3<br>$\bar{0}$ | G2<br>P0 P3 | G0<br>P2 P6 | P0 P1<br>P2 ● P6<br>$\bar{0}$ | G2<br>P0 P6 | P0 P2<br>■<br>P3 P6 |
| 3 | | | | G0<br>G3 | G3<br>P0 P1 | G3<br>P0 P2 | G0<br>P3 P6 | P0 P1<br>♦<br>P3 P6 | P0 P2<br>■<br>P3 P6 | G3<br>P0 P6 |
| 4 | | | | | G1<br>G3 | G3<br>P1 P2 | P0 P1<br>♦<br>P3 P6 | G1<br>P3 P6 | P1 P2<br>P3 ● P6<br>$\bar{0}$ | G3<br>P1 P6 |
| 5 | | | | | | G2<br>G3 | P0 P2<br>■<br>P3 P6 | P1 P2<br>P3 ● P6<br>$\bar{0}$ | G2<br>P3 P6 | G3<br>P2 P6 |
| 6 | | | | | | | G0<br>G6 | G6<br>P0 P1 | G6<br>P0 P2 | G6<br>P0 P3 |
| 7 | | | | | | | | G1<br>G6 | G6<br>P1 P2 | G6<br>P1 P3 |
| 8 | | | | | | | | | G2<br>G6 | G6<br>P2 P3 |
| 9 | | | | | | | | | | G3<br>G6 |

July 20, 1965 J. M. PUGMIRE 3,196,260

ADDER

Filed May 3, 1961 14 Sheets-Sheet 12

United States Patent Office 3,196,260 Patented July 20, 1965

3,196,260

ADDER

John M. Pugmire, Poughkeepsie, N.Y., assignor to International Business Machines Corporation, New York, N.Y., a corporation of New York Filed May 3, 1961, Ser. No. 107,405
11 Claims. (Cl. 235—173)

The invention relates to electronic bit-coded digital adders and more particularly to a checkable adder which generates a set of bit-by-bit summation functions logically from a plurality of applied operands and logically combines the summation functions to develop the sum.

The invention operates by generating bit-by-bit summation functions according to symmetrical logical connectives of similarly weighted bits in each of applied operands. The symmetrical logical connectives AND and OR of a particular bit weight of each operand form respective summation function terms G and P for the related bit weight. Where a particular weight bit, such as, for example, the 6 bit, is present in only on operand digit, the appropriate term is P6. Where the 6 bit is present in both operands, P6 and G6 terms both are appropriate. Since G6 includes P6, the P6 term may be redundant, and, if redundant, is discarded.

Summation functions are available for all addition situations, such as 0+0, 0+1, 0+2 . . . 9+9. There are 55 addition situations for decimal digits 0–9. Some summation funnctions cater to more than one addition situation (5+1 and 4+2 in standard 2-out-of-5 code produce the same summation function). The summation function in each such case correctly indicates the sum.

Elimination of the duplicate summation function circuitry and minimization of P and G terms allow stored-table addition to take place in $m$-out-of-$n$ codes without departing from the $m$-out-of-$n$ ratio of 1 bits to total bits. Basic checking of adder operation takes place on the adder output buses, by the ubiquitous validity check circuits which adhere to major buses in modern computer systems.

Checking of electronic adders in prior art has generally followed two patterns: duplication of adder circuitry with a final sum matching and error detection when the sums do not match, and utilization of weighted value parity codes and comparison of the results with the predicted weight. High speed binary adders have been provided with simultaneous carry propagation and generation which removes the necessity for allowing ripple time for the carries, but such adders have not been readily susceptible to parity checking. Parity bits have generally been dropped at the inputs to the adder and a new parity designation for the sum generated after passage of the operands through the adder. Since the adder is one of the most basic functional elements of a digital computer, any error in the adder is likely to be magnified during subsequent arithmetic operations. The desire for maintaining a parity ratio through the adder has been known but has not heretofore been directly realized.

The $m$-out-of-$n$ code for binary bit coding of decimal digits has no parity bit included as such; the $m$-out-of-$n$ codes, however, require redundancy comparable to that of the extra parity bit. This redundancy indicates single or triple errors in that, if a bit is dropped or picked up, the bit structure will be $(m+1)$-out-of-$n$ or $(m-1)$-out-of-$n$ which is easily decodable as an error. Adders for $m$-out-of-$n$ codes are generally of the matrix or stored table type since $m$-out-of-$n$ codes do not exhibit any specific logical relationship between numbers such as that found in pure binary codes.

A representative single-digit 2-out-of-5 adder in the prior art includes a 2-out-of-5 to 1-out-of-10 decoder for each digit and a matrix of one hundred magnetic cores placed at respective intersections of the ten signal lines representing an addend digit and the ten signal lines representing an augend digit arranged at right angles to one another. Since one addend line and one augend line are activated for each addition, the core at only one intersection is subject to coincident current and provides output. The core outputs are sampled by logical circuits to provide decimal outputs which are then encoded into the required 2-out-of-5 code.

Such stored table adders are generally subject to a situation peculiar to themselves. If the addend is of value X and augend of value Y, the problem is $Y+V=\text{Sum}$; if the values are interchanged, $X+Y=\text{Sum}$. Solution of the problem $X+Y=\text{Sum}$ is by mechanism distinct from that which solves $Y+X=\text{Sum}$.

According to this invention, stored-table addition is performed by referencing the table according to *summation functions* of the addend and augend digits rather than by referencing the table according to the addend and augend digits. Development of summation functions eliminates the distinction between $Y+X=\text{Sum}$ and $X+Y=\text{Sum}$.

The object of the invention, accordingly, is performance of stored-table addition based upon summation functions of the addend and augend. Proper choice of minimal summation functions permits one and only one such function to be activated when error-free information is processed.

Fewer than the valid number of bit variables fails to satisfy any of the minimal conditions. More than the valid number of bit variables activates more than one member of the minimal set of summation functions.

Either occurence creates an output of an invalid form. No time is lost in checking; no additional mechanism is needed since bus parity check mechanisms are standard equipment.

An object of the invention therefore is to maintain an $m$-out-of-$n$ parity ratio throughout addition.

Checked adders in prior art operate by massive duplication of components. Any fault in either the adder proper or the check mechanism produces one or a plurality of errors; the checking mechanism actually increases the chances of fault. Prior checked adders are not readily susceptible to fault localization by computer diagnostics. The checking mechanism drastically impedes diagnostic techniques, since a single set of errors can be caused by more than one fault possibility. A transistor failure in the check mechanism, for example, may produce the same symptoms as a transistor failure in the adder proper.

A feature of this invention in the combination of carry lookahead mechanism, summation function generator and function combiner, which provide raw sum digits while maintaining $m$-out-of-$n$ parity ratio, with carry adjust mechanism and with carry check mechanism which compares the lookahead carry with the actual carry and adjustment. Carry faults, certain of which do not alter

*m*-out-of-*n* validity, thus are detected, providing complete surveillance of the adder by the combination of carry and validity checking mechanisms.

An advantage of the invention is the virtual elimination of need for checking within the adder. This reduces component requirements within the adder, which gives a primary cost reduction and secondary values which may be even greater, in the areas of powering, space, fault elimination, fault detection and delay.

Adder input register elements are limited in fan-out powering—the can drive only a fixed small number of transistor inputs. In many instances, where a checking circuit block requires the same input as an adder proper circuit block, fan-out limitations require duplication of input register powering elements.

Space in digital computers becomes vital, in that length of interconnecting wires is a function of space. In nanosecond circuitry, the speed-of-light delay in interconnecting wires becomes a limitation unless component packing is kept tight. The elimination of large-scale checking logic in the invention provides the advantage of a more compact adder.

Fault elimination by elimination of components is apparent; the fewer components, the fewer are the chances for faults.

Fault detection becomes difficult in circuit areas where an input register element drives more than one circuit element. A single fault can produce several errors in such a situation; a particular error can be caused by each of several possible faults. It is an advantage to be able to pinpoint a particular fault as the cause of a particular error; this allows computer diagnostic programs to provide detailed repair data. Down time can thus be minimized.

It is a possibility, in prior art checked adders, to introduce delay into the adder-checker combination as a result of the additional checking mechanism. By maintaining the *m*-out-of-*n* parity ratio, this invention provides the advantage of checkability by the standard bus parity checkers, which introduces no extra delay.

An object of the invention is to provide an adder which is subject to checking by a standard equipment validity checking mechanism.

A more particular object of the invention is to provide a special check upon between-digit carries.

The foregoing and other objects, features and advantages of the invention will be apparent from the following more particular description of a preferred embodiment of the invention, as illustrated in the accompanying drawings.

In the drawings:

FIG. 4 is a chart showing the bit structure of the instruction word and of the data word of the data processing system of FIG. 1.

FIG. 5 is a chart of the 2-out-of-5 code bit structure.

FIGS. 6*a*, 6*b* and 6*c* are charts of the three basic families of summation functions, which illustrate graphically the retention of the *m*-out-of-*n* ratio of 1 to total bits.

FIG. 7 is a chart of summation functions related to decimal operands and decimal sums.

FIG. 8 is a table of summation functions related to decimal operands. The table shows that no distinction between $X+Y$=Sum and $Y+X$=Sum is made.

Figure 3:
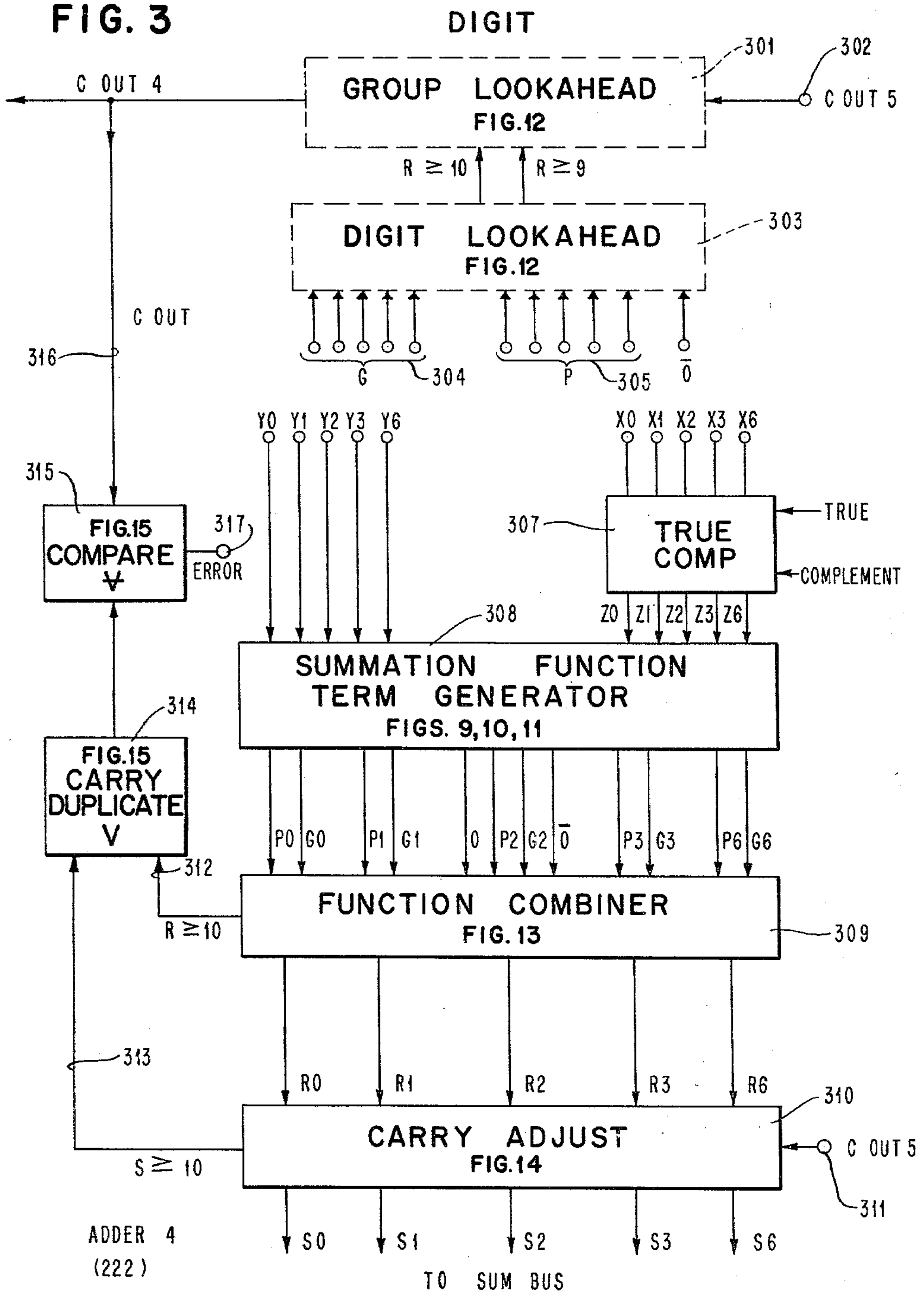
FIG. 3 is a block diagram of a single digit portion of the adder of FIG. 2.

FIGS. 9*a*–9*e* schematically illustrate the true/complement X–Z input converter and the P portion of the summation function term generator 307 of FIG. 3.

Figure 9A:
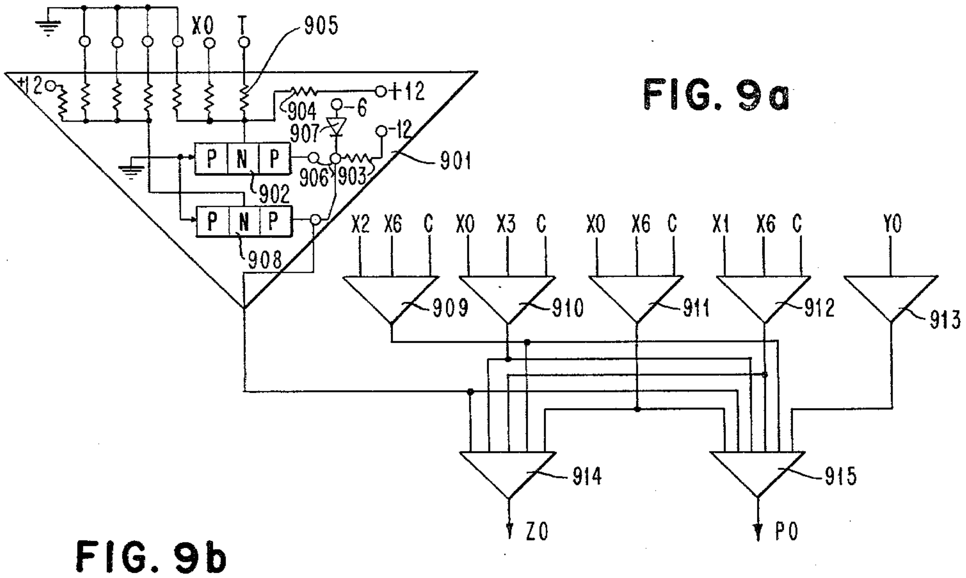
Figure 9B:
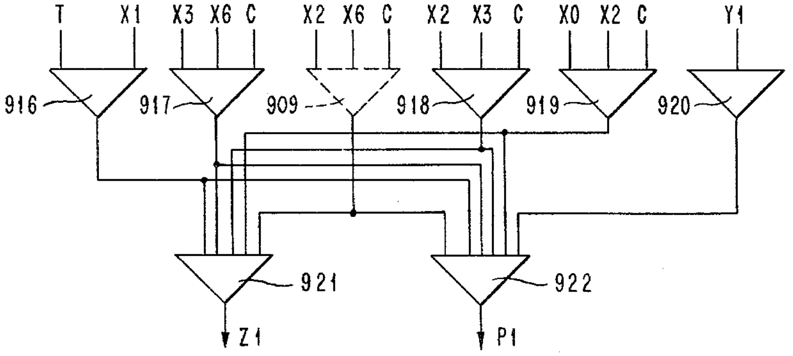
Figure 9C:
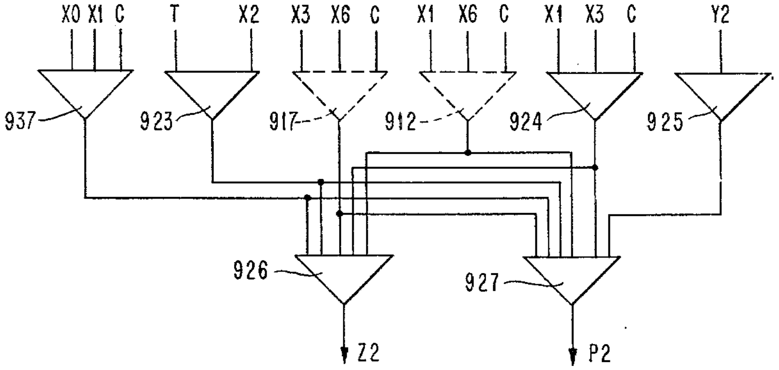
Figure 9D:
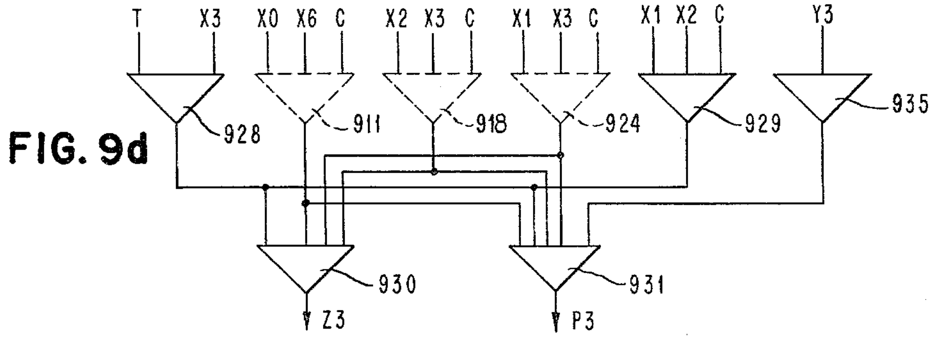
Figures 9E, 10A, 10B:
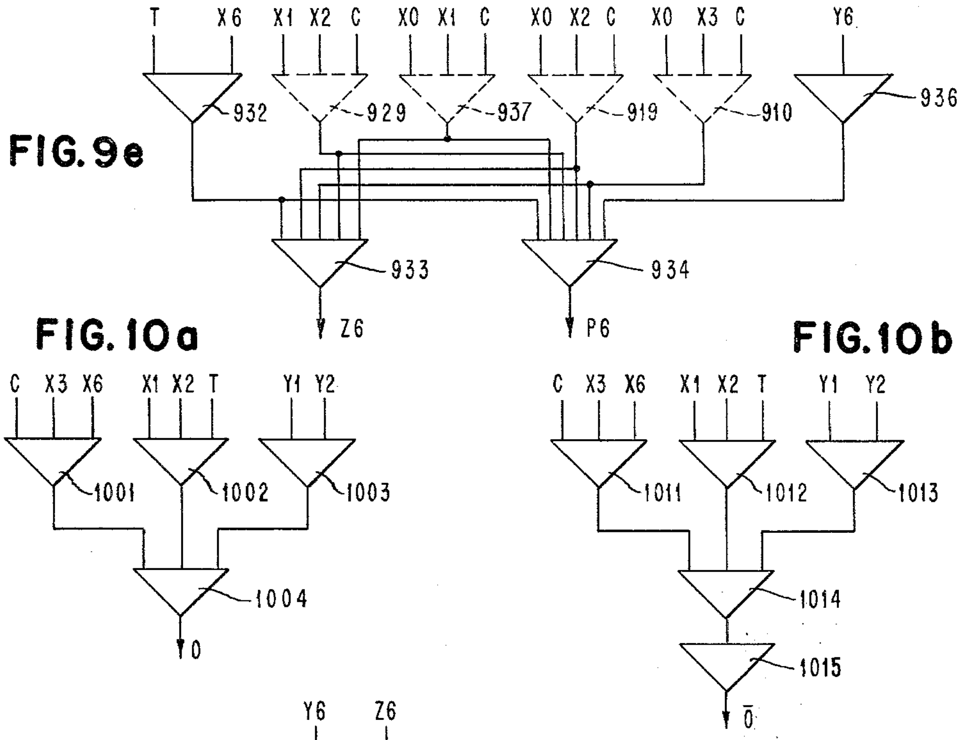

FIGS. 10*a* and 10*b* schematically illustrate the $0$–$\bar{0}$ portion of the summation function term generator 307 of FIG. 3. In 2-out-of-5 code, digits 1–9 are derived by adding bit weights 0, 1, 2, 3 and 6. Decimal 0 is the only digit not "weighted" truly. Since the 0 decimal value in 2-out-of-5 code violates the bit weighting of the code, operands of zero value are pre-decoded.

Figure 11A:
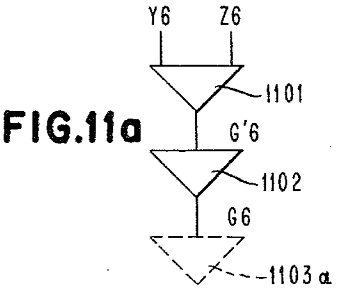
Figure 11B:
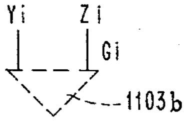

FIGS. 11*a* and 11*b* schematically illustrate the G portion of the summation function term generator 307 of FIG. 3.

FIGS. 12*a*–12*h* schematically illustrate within-digit carry lookahead in detail.

FIGS. 13*a*–13*e* schematically illustrate function combiner block 309 of FIG. 3 in detail.

FIGS. 14*a*–14*e* schematically illustrate carry adjust block 310 of FIG. 3 in detail.

Figure 15:
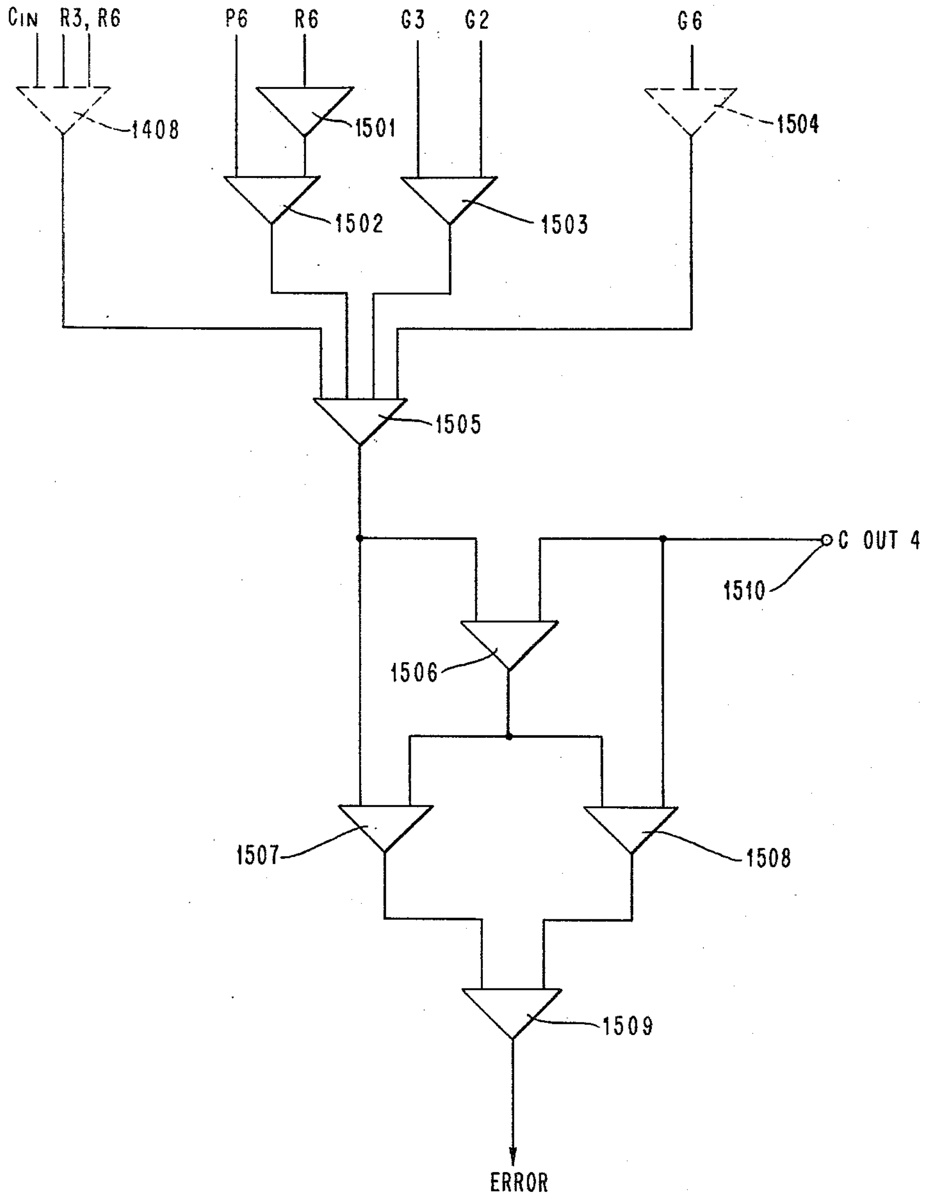

FIG. 15 schematically illustrates error checking circuits including carry duplicate block 311 and compare block 314 of FIG. 3 in detail.

SUMMARY

The adder in the preferred embodiment is of the simultaneous carry parallel type. It operates by generating 4-out-of-10 AND-OR summation functions of the bit-by-bit relationships of the 2-out-of-5 coded decimal operands and by decoding combinations of AND–OR summation functions in a combiner to produce the 2-out-of-5 bit structure of the sum.

Digit carries are produced in a carry lookahead section and inserted in a carry adjust logical level which alters the bit structure of the raw sum from the combiner to a bit structure for the final sum. The final sum includes effects of carries. The characteristics of the *m*-out-of-*n* code are maintained throughout, although at one point the code might more properly be thought of as 2*m*-out-of-2*n*. Single or triple errors are subject to parity checking on the outputs. A self-cancelling double error is not possible from a single fault. The predicted carry is checked against the final sum and raw sum bit structures to determine whether the sum formed was greater than decimal 9; i.e., whether a carry should have been produced. The adder thus not only retains its 2-out-of-5 error detection ability but also checks actual carry against lookahead carry.

Figure 1:
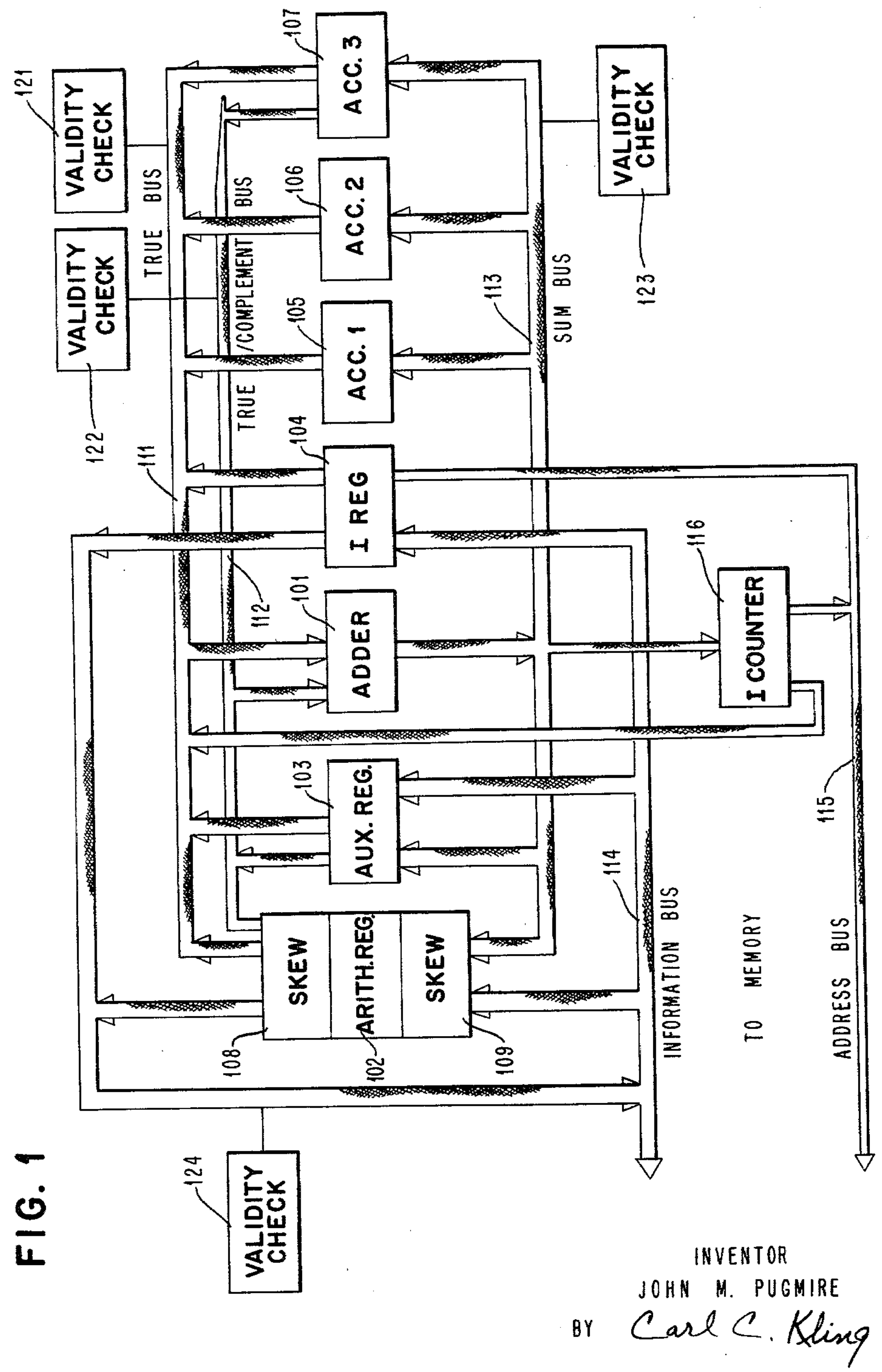
FIG. 1 is a block diagram of a data processing system in which the adder of the invention operates.

*FIG. 1.—System*

Adder 101 according to the preferred embodiment of the invention operates well in the context of a parallel data processing system. Registers 102–107 provide necessary instruction, result and operand storage. Arithmetic register 102 is connected via skew control circuitry 108 and 109 to various full-word buses 111–114. Address bus 115 and instruction counter 116 provide basic operation control. Auxiliary register 103, instruction register 104, accumulator (1) 105, accumulator (2) 106 and accumulator (3) 107 similarly connect to other registers and to adder 101 via appropriate buses.

The ordinary add operation involves the arithmetic register 102, adder 101, accumulator (1) 105 and frequently one or both of the other accumulators, for example accumulator (2) 106. With the augend stored in arithmetic register 102 and the addend stored in accumulator (1), suitable gates operated under basic control of the instruction counter 116 and instruction register 104 route the addend via true bus 111 to adder 101 and route the augend via true/complement bus 112 to adder 101. The sum developed in adder 101 passes via sum bus 113 and skew circuitry 109 to arithmetic register 102 or back to accumulator (1).

Validity check blocks 121, 122, 123 and 124 are associated respectively with true bus 111, true/complement bus 112, sum bus 113 and information bus 114. The preferred embodiment operates in 2-out-of-5 code, which is a popular representative of the *m*-out-of-*n* code family. In *m*-out-of-*n* codes, the validity check is a stringent check, since either dropping or picking up a bit produces an error signal. All 1's or all 0's on the bus produce a validity check. In all error situations, except the situation of exact compensation, where a particular bit is dropped and another bit picked up simultaneously, the validity check is absolute.

Details of a suitable validity check circuit for 2-out-of-5 code are available in the following publication: IBM Customer Engineering, Manual of Instruction, 7601 A&P Control Unit, Section 2.3.04 Validity Check Circuit, (FIG. 2.3-7), pages 24-25.

Figure 2:
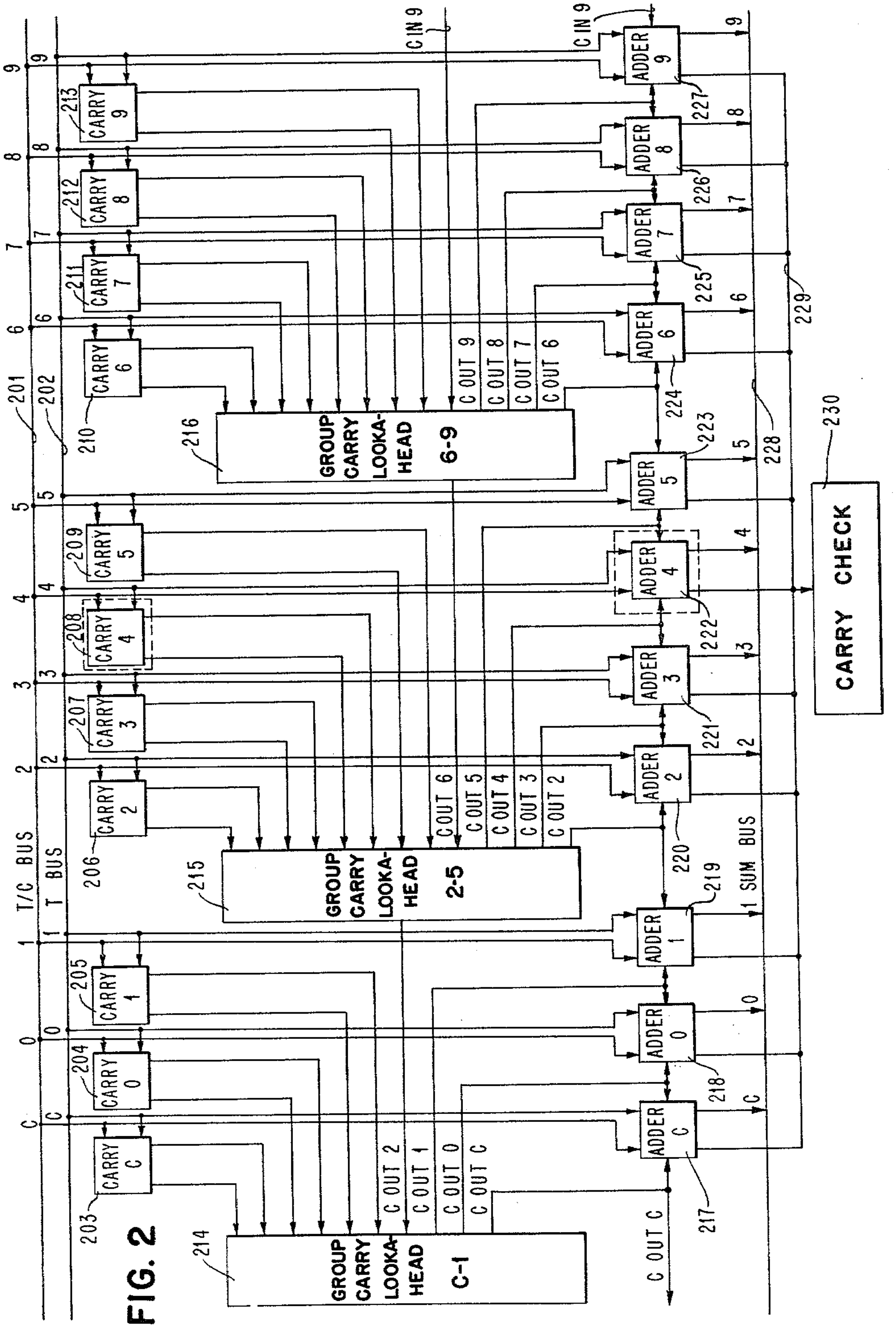
FIG. 2 is a block diagram of a preferred embodiment adder according to the invention.

*FIG. 2.—Adder*

The routing of augend and addend via true bus 111 (FIG. 1) and true/complement bus 112 (FIG. 1) respectively to adder 101 (FIG. 1) was explained above under subhead FIG. 1.—System. The appropriate portion of the true/complement bus 201 and the appropriate portion of the true bus 202 appear in FIG. 2. Carry lookahead circuits include digit carry blocks (blocks C, 0, 1 . . . 9) 203 to 213, and include group carry lookahead blocks 214, 215 and 216. Lookahead carry signals and the operand digits themselves are applied to adder blocks (C, 0, 1 . . . 9) 217–227. The outputs of the adder blocks pass to portion 228 of the sum bus. Signals from adder blocks 217–227 also pass via carry check signal line 229 to carry check block 230.

The bit signals of the respective augend digits and addend digits are applied simultaneously to carry blocks 203–213 and to adder blocks 217–227. The carry blocks feed group carry lookahead blocks, which produce between-digit carry signals for the adder blocks as well as group carry signals.

The digit 4 stage of the adder is to be explained in detail infra. Carry block 208, group carry lookahead block 215 and adder block 222 are involved. To the extent that the C OUT 6 signal from group carry lookahead block 216 affects carries from group carry lookahead block 215, block 216 is involved.

*FIG. 3.—Digit 4*

Group carry lookahead block 301 is responsive to a carry out signal (C OUT 5) together with a R≥9 signal at terminal 302, or to a R≥10 signal, to produce the digit lookahead carry signal C OUT 4. Digit carry lookahead block 303 is responsive to G and P signals at terminal groups 304 and 305. Relating FIG. 3 to FIG. 2, group carry lookahead block 301 corresponds to a portion of group carry lookahead block 216 and digit carry lookahead block 303 corresponds to carry block 208. Digit inputs for the augend are Y0, Y1, Y2, Y3 and Y6. Digit inputs for the addend are X0, X1, X2, X3 and X6. The addend digit is passed true for addition or complement for subtraction by true/complement block 307, forming Z0, Z1, Z2, Z3 and Z6 at summation function term generator 308 where a summation function terms P, G, 0 and $\overline{0}$ are developed. Summation function term P signals pass to summation function term combiner 309 where the bit structure of the raw sum R0, R1, R2, R3, and R6 is developed. The raw sum is applied to carry adjust block 310 together with a carry signal (C OUT 5) at terminal 311. The final sum bit structure S0, S1, S2, S3 and S6 is the output of carry adjust block 310. The *m*-out-of-*n* relationship between 1 bits and total bits is maintained throughout the summation function generator 308, function combiner 309 and carry adjust block 310. Any error will be detectable as a validity check on one of the buses, most probably the sum bus. A check on carry adjust block 310, however, must indicate whether or not a carry out signal (C OUT 4) is proper, since the *m*-out-of-*n* relationship in the digit 3 area will be maintained whether or not a carry out signal C OUT 4 develops. Accordingly, the bit structure of the raw sum is monitored in function combiner 309 to produce an R≥10 signal on line 312 and the bit structure of the final sum is monitored in carry adjust block 310 to produce an S≥10 signal on line 313. Carry duplicate OR (V) circuit 314 passes a carry duplicate signal to compare block 315 where it is compared exclusive OR ($\underline{\vee}$) with the original lookahead carry signal (C OUT 4) from group carry lookahead block 301 on line 316. Any mismatch between the lookahead carry and the duplicate carry signal produces an error signal at error terminal 317.

*FIG. 4.—Word format*

The instruction word and also the data word of the preferred embodiment includes ten digits 0–9 and sign. Each digit comprises a 2-out-of-5 code bits 0, 1, 2, 3 and 6; the sign comprises 2-out-of-3 code of 0, 3 and 6. The usual instruction word involves: an operation code, digits sign, 0 and 1; an indexing word address, digits 2 and 3; a field control designation, digits 4 and 5; and address, digits 6–9. The instruction format is single address, indexed, field controlled. To add two numbers, three instructions are either required or inferred from past operations or future operations. The first instruction places one operand such as the addend in accumulator (1), 105 FIG. 1. The second instruction reads out the second operand, for example the augend, to arithmetic register 102, causes the two operands to be applied to adder 101, and returns the sum via sum bus 113, skew control logic 109 to arithmetic register 102 or back to accumulator (1) as required. In response to a third instruction, the sum from accumulator (1) 105, is stored in a designated address in memory.

*FIG. 5.—2-out-of-5 code chart*

Conversion from decimal to 2-out-of-5 code follows a standard weighted code logic. Bits are weighted 0, 1, 2, 3 and 6. A combination of two of these weights can be developed for each of the digits 1–9. The 0, however, violates the weighing rules. The 0 combination is bits 1 and 2. Bit weightings, however, are not especially significant in 2-out-of-5 code. There is no simple relationship, so far as binary operating devices are concerned, between the 2 weight and the 3 weight. The chart also includes a scale for the 9's complement.

*FIG. 6.—Summation functions*

In addition, using 2-out-of-5 code, there are only three basic families of combinations of the P (OR) and G (AND) summation function terms. FIG. 6*a* shows the functions for the addition of decimal 4 to decimal 2. Decimal 4 includes a 1 bit and a 3 bit; decimal 2 includes a 0 bit and a 2 bit. The P term, derived by taking the OR function of 1 valued bits, is 11110, or P*i*; P*j*; P*k*; P*l*. The G term is 00000, since the bit structure of decimal 4 and decimal 2 contains no similarly weighted 1 bits. The elimination of the problem of transposed operands becomes quickly apparent. It makes no difference whether the digit 4 is the Y or the Z, since the P and the G functions are not affected by placement of the operands.

FIG. 6*b* illustrates the generation of the P and G function terms for the addition of decimal 4 and decimal 3, which belongs to the second family of summation function terms G*j*; P*j*; P*k*; P*l*. P*j* is a redundant term since G*j* includes P*j* as a necessary operator. The decimal 4 bit structure 01010, when OR'ed with the decimal 3 but structure of digit Z (01100) produces the P term 01110.

FIG. 6*c* illustrates the third family. Addition of decimal 4 to decimal 4 produces G terms for the weight 1 bit and for the weight 3 bit and, of course, P terms for the weight 1 bit and weight 3 bit. It is to be noted that four 1 bits appear in combining the P and G terms in each of the three families illustrated in FIGS. 6*a*, 6*b* and 6*c*.

The *m*-out-of-*n* ratio is maintained through the choice of functions P and G. Other summation functions, generally in pairs of complementary functions, may produce other counts of 1 bits in the summation functions.

The choice of function "Exclusive OR" and "Not Exclusive OR," for example, always produces five 1 bits out of the ten possible.

The combiner receives inputs in the form of a $2m$-out-of-$2n$ code, together with (checked) 0, $\overline{0}$ signals. The combiner itself comprises a minimal set of summation function terms, each member of which belongs to one of these catagories:

| | | | | | | |
|---|---|---|---|---|---|---|
| (a) | G$i$ | (P$i$) | G$j$ | (P$j$) | | |
| (b) | G$i$ | (P$i$) | | P$j$ | P$k$ | |
| (c) | | P$i$ | | P$j$ | P$k$ | P$l$ |

The terms in parentheses are deleted because of redundancy. A valid number of G$i$, P$i$, inputs will energize one and only one member of the minimal set; the output encoder of the combiner will produce a $m$-out-of-$n$ raw sum digit. Greater or fewer than the correct number of variables will energize no members or more than one member of the minimal set, and hence provide an output violating the $m$-out-of-$n$ requirements. The combiner thus provides a checked transition from a (checked) $2m$-out-of-$2n$ code to a (checked) $m$-out-of-$n$ code.

*FIG. 7.—Summation function chart*

Where digits Y and Z are each 4, the P term is 01010 and the G term 01010. Since 4+4 equals 8, the combination summation function G1, G3 produces a raw sum of 8.

Where digit Y is 7 and digit Z is 8, the P summation function term is 01101 and the G summation function term 00001. 7+8 equals 15 as does 8+7 equal 15. Summation function G6, P1, P2, produces raw sum 5 with a carry indicated by an asterisk *.

Addition of decimal digit 1 to decimal digit 9 produces P term 11011 and G term 00000, as does addition of 9+1, 3+7, 4+6, 7+3 and 6+4. Summation function P0, P1, P3, P6 produces raw sum digit 0 with a carry (0*).

Three situations exist where summation functions are identical although different sums exist. These situations all occur in the P$i$; P$j$; P$k$; P$l$; family. For example, addition of decimal digits 1+5 or 2+4 (sum=6) produces the P function 11110 and the G function 00000. Summation function terms P0, P1, P2 and P3 are produced. Addition of decimal digits 0+3 (sum=3) also produces the same P and G functions. Thus the summation terms P0, P1, P2 and P3 may indicate either the sum 6 or the sum 3. The same situation exists in the addition of decimal digits 1+8 or 2+7 (sum=9) and the addition of decimal digits 0+6 (sum=6). Both produce the summation term P0, P1, P2, P6. The third case is in the addition of decimal digits 4+8 or 5+7 (sum=2*) and the addition of 0+9 (sum=9). Both produce summation terms P1, P2, P3, P6. It will be noted that in each of these three cases, one of the additions producing the ambiguous summation terms involves an addend or augend equal to 0. Proper identification of the summation terms for the different sums may therefore be accomplished by adding an additional term to the summation function terms, this term being 0 or $\overline{0}$. Where either the addend or augend is 0 the summation function term 0 is used with the ambiguous term P$i$, P$j$, P$k$, P$l$ and when neither addend nor augend equals 0 the $\overline{0}$ function term is used. The means for generating the 0–$\overline{0}$ function term is described later herein with reference to FIG. 10.

The summation function P terms which are included in G terms are discarded as redundant. The chart shows a row of summation functions and a row of functions used in combiner 309 (FIG. 3). FIG. 7 is illustrative only; there is no attempt at completeness.

*FIG. 8.—Summation function table*

A minimal summation function can be generated for each addition. Addition of 0+0 for example, produces functions G1, G2, P1 and P2. Since terms G1 and G2 include respectively terms P1 and P2, the zero sum can be decoded directly from function G1, G2. FIGURE 8 shows the functions selected for the preferred embodiment. Addition of (3+1) or of (1+3), for example, produces the raw sum 4 which is decoded as the summation function (combination of terms) G0, P1 and P3. The term P0, which is inherent in G0, is discarded as redundant.

Redundant terms are eliminated throughout. This reduces the number of components necessary by holding fan-out from each input register to a minimum. The chance for fault compensation (for example, a redundant P0 connection might mask a faulty G0 connection) is thus eliminated.

The total number of summation functions required, as shown by the table, is 55 for addition of two decimal digits. Symbols within blocks indicate 7 occurrences where additions of different digits produce identical summation functions and identical sums. Diagonally aligned blocks having the same symbol (ball, diamond, square) contain duplicate summation functions. Thus, 48 distinct summation functions suffice for the preferred embodiment. FIGURE 8 is further explained infra in connection with the discussion under subhead FIG. 13.—Function combiner, together with the actual mechanism for producing the summation functions.

*FIG. 9.—True/complement input converter—P generator*

The adder of the preferred embodiment is constructed of transistor stroke blocks. The stroke block functions as an AND inverter for a positive input; it functions as an OR inverter for negative inputs. Depending upon the polarity of output which produces a functional signal, identical stroke blocks may be designated AND circuits or —OR circuits. Representatives of stroke blocks are the circuits sometimes called NOR, (Not OR) and its close relative NAND (Not AND); all provide the characteristic inversion together with logic.

FIG. 9*a* illustrates the true/complement logic for the addend weight 0 bit (or Z0) and the P term P0. Stroke block 901 is shown in detail; all other stroke blocks are shown schematically. In stroke block 901, pnp transistor 902 is connected to ground and via output resistor 903 to a source of voltage at —12. The base of transistor 902 is connected via resistance 904 to a source of voltage at +12. Transistor 902 is normally held cut off, producing at terminal 906 an output voltage of $-s$. $-s$ Equals —6 volts due to clamping diode 907 which connects terminal 906 to a regulated source of voltage at —6 volts. If any input to transistor 902 is negative, a negative bias via an input resistance such as 905 forward biases transistor 902, raising the voltage at terminal 906 to approximately ground potential, $+s$. Only when all inputs to transistor 902 are $+s$ does transistor 902 cut off; it functions as an AND inverter or as a —OR. The characteristics of circuit components normally used make an input fan of three or fewer advisable for the ordinary single-transistor stroke block. To produce input fans greater than 3, additional transistors such as 908 are connected common collector with the basic stroke block transistor 902 to share output resistor 903 and function as a six-input stroke block. Additional transistors can be added up to a total of 7 (for a 21-input stroke block) without creating overload problems. Output fans are generally limited to 3, with emitter follower repowering for greater fan-out. Throughout the preferred embodiment drawings FIGURES 9–15, stroke blocks are shown schematically as triangles regardless of the input and output fans.

Inputs to block 901 are X0 and T. T is the signal for true add. Other stroke blocks inputs are X2, X6, C; X0, X3, C; X0, X6, C; X1, X6, C; and Y0. The output of block 914 is Z0, where Z is the digit resulting from the true or complement digit X0. Block 901 produces the Z0 term directly from the X0 term and the true signal. Blocks 909–912 produce the Z0 term during complement situations. Block 909, for example, produces a $-s$ signal upon the coincidence of the X digit 8 and a complement signal C. The FIGURE 5 chart shows that the complement of 8 does not contain a weight 0 bit, as does the complement of 7 and the complements of 6 and 3. Block 910 is conditioned by X0, X3 (decimal 3) and C to produce the Z0 signal via block 914. Block 914 functions as an OR circuit for the $-s$ output of block 910. Similarly blocks 911 and 912 produce the Z0 output via block 914 upon coincidence of decimal digit 6 bit values and C and decimal digit 7 values and C respectively.

Block 915 produces the P0 signal, which is the OR function of 1 bits at weight 0 (Y0 or Z0) of operands Y and Z. Inputs to block 915 are identical to those of block 914 with the addition of a Y0 term from block 913.

FIGS. *9b–9e* are similar in all significant respects to FIGURE *9a*. Block 916 produces the Z1 signal upon coincidence of X1 and T; blocks 917, 909, 918 and 919 produce the Z1 signal upon detection of bit structures for those decimal digits whose 9's complements include the 1 bit. Block 920 introduces the Y1 bit which is a part of the P1 term. Blocks 921 and 922 respectively produce the terms Z1 and P1. Block 909 is shown dotted in FIG. *9b*. To make the logic more apparent, the circuits for producing Z and P terms for each of the five bit weights are shown entire; each bit weight Z and P function term generator is a separate FIGURE *9a–9e*. Where a term such as X2, X6, C is common to more than one bit weight, the output of a single stroke block such as 909 is fanned out to each affected bit. To avoid confusion of criss-crossed lines in the drawings, the stroke block is shown dotted to indicate that it appears elsewhere in the figures and the reference number of the first appearance is used.

The circuits in FIGS. *9a–9e* produce terms Z0, Z1, Z2, Z3 and Z6 as well as summation functions P0, P1, P2, P3 and P6. These terms and functions are available wherever required by circuits throughout the preferred embodiment.

*FIG. 10.—0–$\bar{0}$ Summation function generator*

FIG. *10b* illustrates the decimal 0 term generator; FIG. *10b* illustrates the decimal $\bar{0}$ term generator. The circuits in FIG. *10a* and *10b* are identical except for a final inverter in FIG. *10b*. It is not advisable, however, to conserve stroke blocks in this area by using the common output techniques such as those used in FIGURE 9, since a failure in the 0–$\bar{0}$ area could otherwise occur undetected. The 0 decimal value occurs in three situations. Stroke block 1001 produces the 0 signal when X1 and X2 bits (decimal 0) are present when adding true. Block 1002 produces the 0 signal when bits X3 and X6 are present and the C signal appears, because the complement of decimal 9 is 0. Block 1003 produces the 0 signal when digit Y is a decimal 0. Block 1004 functions as a —OR circuit to produce a $+s$ 0 functional signal. In FIG. *10b*, blocks 1011–1014 are identical in input and function to blocks 1001–1004, respectively, to produce the decimal 0 signal at the output of block 1014. Inverter 1015 inverts to the not decimal 0 signal, or $\bar{0}$ signal.

*FIG. 11.—Summation function Gi generator*

For any particular bit weight, such as for the 6 weight, as illustrated in FIG. *11a*, the G function is generated by an AND circuit followed by an inverter. Stroke block 1101 produces the G'6 signal at its output with inputs Y6 and Z6. Block 1102 inverts to G6 and provides the G6 signal as an input to sum stroke block 1103*a* which receives the G6 signal. A peculiarity of stroke logic is that, in situations such as this, it is just as effective to feed the original Y and Z terms as a bundle into the receiving block 1103' (FIG. *11b*) as to feed the inputs through stroke blocks 1101 and 1102. G*i*, then, is available as a bundled pair of Y*i* and Z*i* lines connected as inputs to any receiving stroke circuit 1103*b*. G'*i* is available, as G'*b* in FIG. *11a*, from stroke block 1101. Where fan in and fan out problems occur, it often is just as effective to follow the more straightforward techniques of *11a*, but where the receiving logic makes it possible it is often advantageous to utilize the G'*i* signal or the bundling technique.

*FIG. 12.—Carry lookahead*

Stroke blocks 1201–1206 combine to produce the digit generate term DG. (Block 1201 is generally not necessary since its output is G'6, a term which is available from the circuit of FIG. *11a*.) G6 occurs only when the addition is of decimal values each of which includes the bit weight 6, i.e., 6, 7, 8 or 9. A carry always occurs in such additions. Block 1206 functions as an OR circuit to generate the DG term.

Block 1202 indicates a carry produced by addition of 5+5, the only situation where G2, G3 occurs.

Block 1203, with inputs including G2, P6, indicates a carry for additions of decimal 8 and a 2 weight—8+2; 8+5 8+8. Since the digit 0 includes a 2 weight, the $\bar{0}$ term is included as input to eliminate carry production in addition of 8+0.

Block 1204 is subtle. It indicates a carry for additions as follows:

9+1; 9+2; 9+3; 9+6; 6+4; 6+5; 6+7; 6+8; 3+7; 3+8; 4+7; 4+8; 4+9; 5+7; 5+9.

The derivation of this carry is most simply explained inductively. The P3, P6 inputs indicate a weight of at least 9. The $\bar{0}$ input eliminates the possibility of the 9+0 addition which produces no carry. The output of block 1205, $\overline{Y0Z0}$, eliminates the possibility of the 6+3 addition which produces no carry. All other possibilities produce carries. Block 1206, therefore, produces the carry generate term DG whenever $Y+Z\geq 10$.

FIG. *12b* produces the carry propagate term DP whenever $Y+Z=9$ and in many cases where $Y+Z>9$. Block 1210, with inputs P6, P3, indicates a weight of at least 9, derived from additions 9+(any digit) and from additions (6 or greater)+(3 or greater). Block 1211 indicates a weight of at least 9 in $\bar{0}$ additions 7+2, 8+1, 8+4, etc. Block 1212 indicates a weight of 9 in addition of digits 5+4.

The terms DP and DG are combined in carry lookahead circuits according to standard procedures for simultaneous carry production. See, e.g., U.S. Patent 2,879,001, Simultaneous Carry Adder, Weinberger et al., issued March 24, 1959, for exhaustive treatment of DP, DG carry development. Details of carry lookahead circuits are shown in FIGS. *12c–12h*, and discussed briefly infra, for convenience in understanding the entirety of the adder.

FIG. *12c* illustrates carry lookahead. Carry into any order is developed by a carry generate term DG from the previous order or by a combination of a carry propagate term DP from the previous order plus a carry into that previous order. For example, Cin8=DG9+DP9, Cin9.

FIG. *12c* shows blocks 1219–1246 which function to produce simultaneous carries for digit positions C, 0, 1 . . . 9. Blocks 1219–1229 are DG, DP blocks for the related digit positions C, 0, 1 . . . 9. These blocks produce signals whenever either a DG or a DP term is available. The outputs of blocks 1219–1229 are available to group lookahead carry blocks 1230–1235 and to digit lookahead carry blocks 1236–1246. Lookahead carry block 1235 produces the carry in 8 signal (Cin8) directly upon coincidence of the output of DG, DP block 9 (1229) and the carry in 9. The carry out of lookahead carry 8 (1235) is connected to lookahead carry 6 block 1245 and lookahead carry 7 block 1246. Block 1246 is effectively a logical AND circuit coincidently conditioned by the output of lookahead 8 block 1235 and by DG, DP block 1228. As embodied, block 1246 is conditioned by DG8 or (DP8) Cin8. The DG and DP outputs have been consolidated on one line for simplicity. It is desired to carry into position 7 whenever position 8 generates a carry (DG8) or whenever position 8 propagates a carry (DP9, Cin9).

The logic for other lookahead carries is as follows:

Cin8=DG9+DP9, Cin9
Cin7=DG8+DP8, Cin8
Cin6=DG7+DP7, DG8+DP7, DG8, Cin8
Cin5=DG6+DP6, DG7+DP6, DP7, DG8+DP6, DP7, DP8, DG9+DP6, DP7, DP8, DP9, Cin9
Cin4=DG5+DP5, Cin5
Cin3=DG4+DP4, DG5+DP4, DP5, Cin5
Cin2=DG3+DP3, DG4+DP3, DP4, DG5+(DP3, DP4, DP5) Cin5=(DG3–5)+(DP3–5) Cin5
Cin1=[(DG2+DP2, DG3+DP2, DP3, DG4+DP2, DP3, DP4, DG5)+(DP2, DP3, DP4, DP5) Cin5] (No F.P.)+[DGC+DPC, DG0+DPC,DP0, DG1)] (F.P.)=(DG2–5+DP2–5 Cin5) (No F.P.) +(DGC–1) (F.P.)
Cin0=DG1+[DP1 (DG2+DP2, DG3+DP2, DP3, DG4+DP2, DP3, DP4, DG5)+DP1 (DP2, DP3, DP4, DP5) Cin5] (No F.P.)+DP1 (DGC+DPC, DG0 +DPC, DP0, DG1) (F.P.)=DG1+DP1 (DG2–5 +DP2–5 Cin5) (No F.P.)+DP1 (DGC–1) (F.P.)
CinC=(DG0+DP0, G1)+(DP0, DP1) (DG2+DP2, DG3+DP2, DP3, DG4+DP2, DP3, DP4, DG5) +(DP0, DP1) (DP2, DP3, DP4, DP5) Cin5
Cout=(DGC+DPC, DG0,+DPC, DP0, DG1)+(DPC, DP0, DP1) (DG2+DP2, DG3, DG4+DP2, DP3, DP4, DG5)+(DPC, DP0, DP1) (DP2, DP3, DP4, DP5) Cin5.

As shown above, carry into any digit position is a function of a carry generate term DG from the previous position or a combination of a carry propagate term DP from the previous position and a carry into the previous position. The carry into the previous position in turn is a function of a carry generate from its own previous position or a carry propagate together with a carry generate. For a 10 digit adder, the lookahead carry terms in the higher orders become unwieldy. Accordingly, lookahead is generally provided in groups, and the group lookahead carries introduced at a final stage AND (—OR) circuit 1236–1246 to provide the actual carry in signals.

For floating point operations, it is desirable to treat positions 0 and 1 as the characteristic of a floating point number. In the floating point of the usual type, the decimal point is always placed at the left of the most significant non-zero digit in the mantissa. The characteristic is then the power of 10 which will raise or lower the value of the mantissa to the desired level. Because it is desired to work in both fractions and whole numbers, it is common to modify the characteristic by 50, that is, to assign the characteristic value 50 to the value $(10)^0$.

This allows the characteristic to be handled by simple addition and subtraction but still remain a whole number over the range $(10)^{-49}$ to $(10)^{+49}$.

The facility is provided for anticipatory end-around carry for the 0–1 positions during Floating Point. The selection for this carry insertion is made by the F.P., No F.P. lines.

Figure 12A:
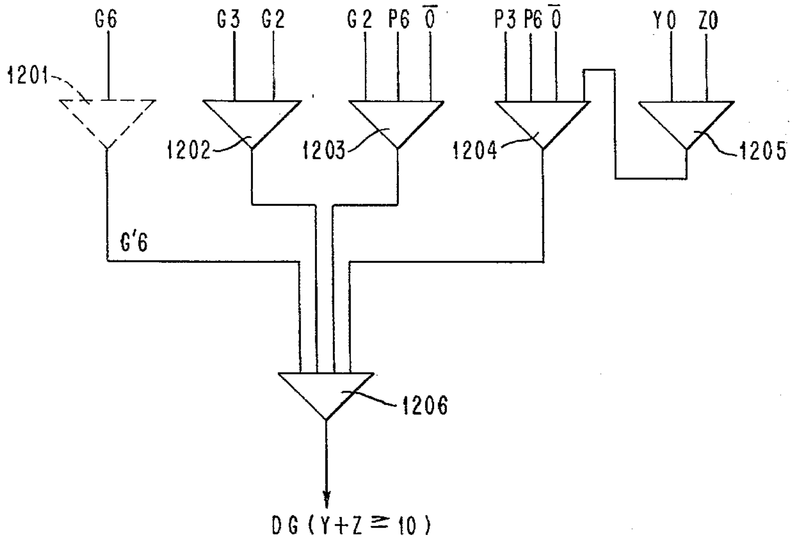
Figure 12B:
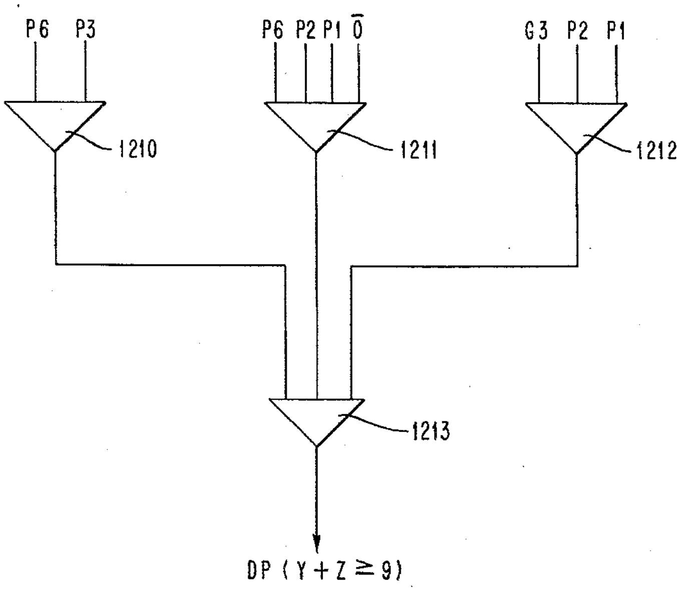
Figure 12C:
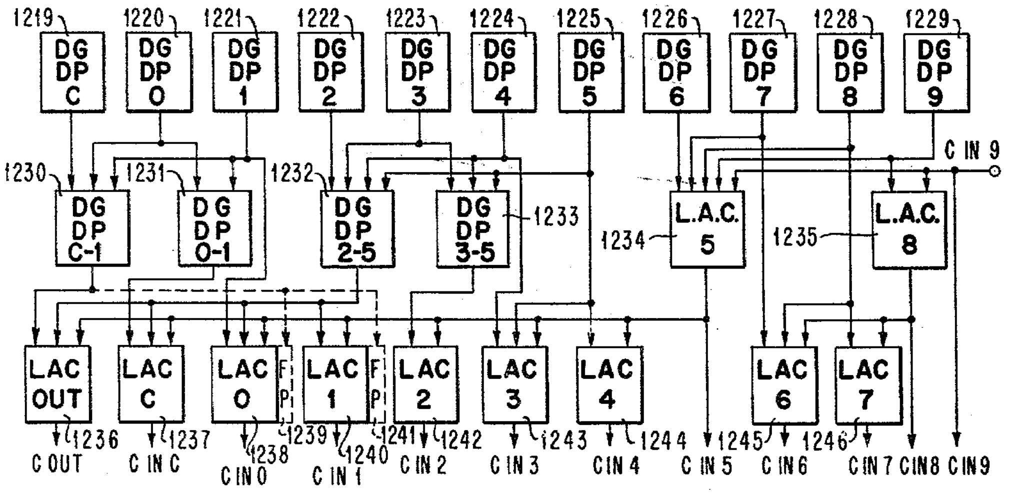
Figures 12D, 12E, 12F, 12G, 12H:
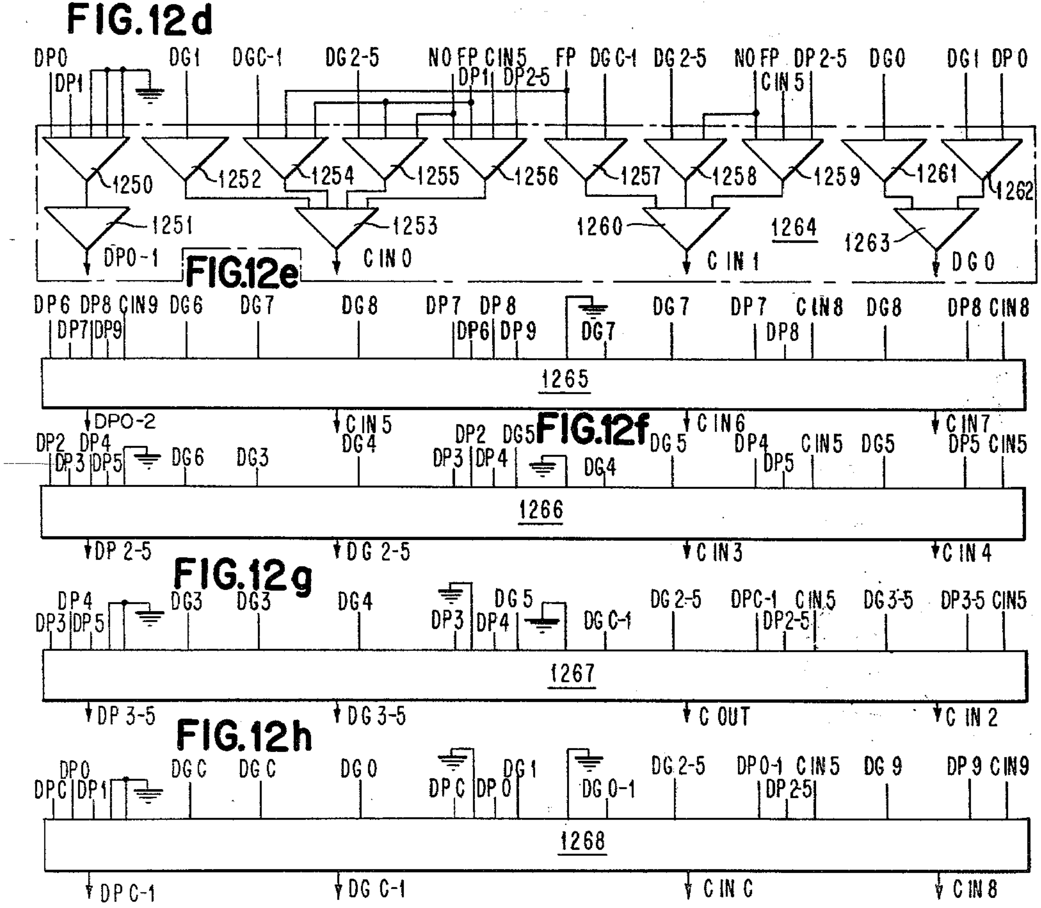

*FIG. 12d.—Carry lookahead card*

The carry lookahead circuits are laid out so that 5 identical cards make up the circuit. One card appears in FIG. 12*d* in detail; four other cards appear in FIGS. 12*e*, 12*f*, 12*g* and 12*h* as block diagrams of circuits identical to those on the card of FIG. 12*d*, with inputs and outputs detailed.

Blocks 1250–1263 make up card 1264. Cards 1265–1268 are identical to card 1265. Block 1250 forms an AND circuit for up to five inputs. Other blocks 1252–1262 serve as AND circuits; the outputs of the AND circuits feed —OR circuits 1251–1263.

The —OR circuits produce outputs as follows:

| | | | |
|---|---|---|---|
| FIG. 12*d*—DP0–1 | Cin0 | Cin1 | DG0 |
| FIG. 12*e*—DP0–2 | Cin5 | Cin6 | Cin7 |
| FIG. 12*f*—DP2–5 | DG2–5 | Cin3 | Cin4 |
| FIG. 12*g*—DP3–5 | DG3–5 | C OUT | Cin2 |
| FIG. 12*e*—DPC–1 | DGC–1 | CinC | Cin8 |

The lookahead carry cards fulfill the functions assigned to them as explained in connection with FIG. 12*c*, supra.

*FIG. 13.—Function combiner*

Functions are combined in straightforward fashion. G*i*, P*i*, 0 and $\bar{0}$ terms in appropriate combination form summation function signals according to the chart in FIG. 8. These summation function signals are applied to multi-input OR blocks to produce weight bits of the raw sum, R0, R1, R2, R3 and R6, as appropriate. Weight bits R0, for example, occur in the following digit sums: (see FIG. 5) 1, 2, 3, 6, 11, 12, 13 and 16. Weight bits R1 occur in digit sums 0, 1, 4, 7, 10, 11, 14 and 17.

Figure 13A:
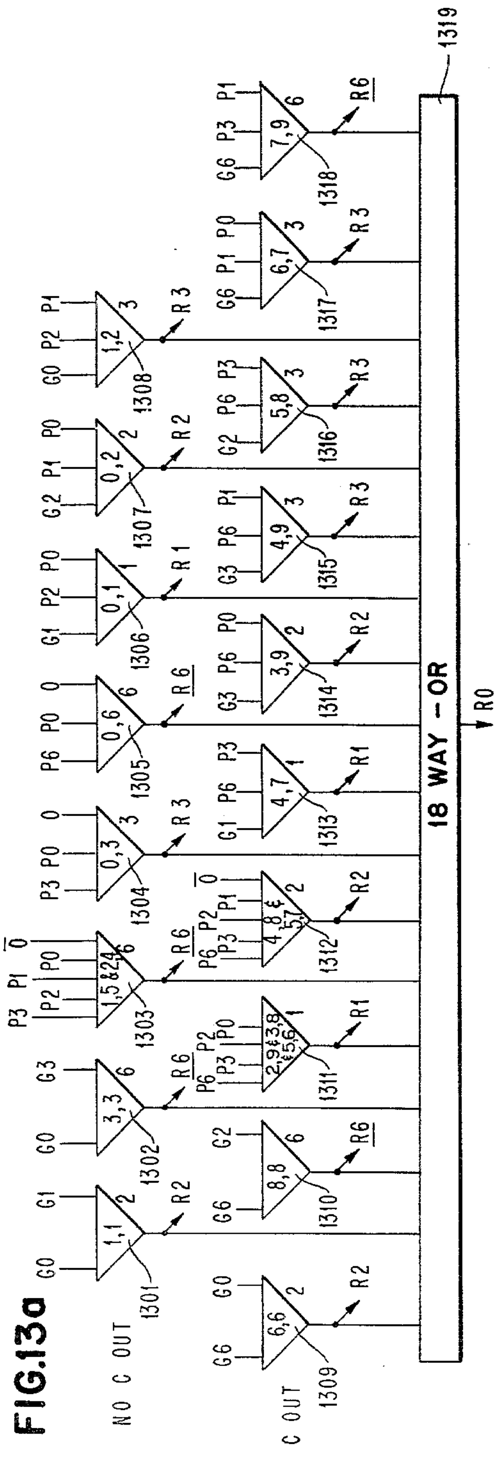

FIG. 13*a* illustrates the function combiner R0 section of the digit 4 adder. Stroke blocks 1301–1319 are involved. Block 1319 is a multi-input-OR block to pass the R0 signal for all summation function combinations which are to contain the weight 0 bit in the raw sum.

Block 1301 functions during the 1+1 addition, where terms G0 and G1 appear. The sum is to be 2, which, in 2-out-of-5 code is a weight 0 bit and a weight 2 bit. Block 1301 output signal, —*s* for the G0, G1 summation function, conditions a transistor in stroke 1319, which conducts, bringing the output of block 1310 to +*s* or ground potential, which is the R0 signal.

Block 1302 functions similarly to block 1301, producing a —*s* output for the 3+3 addition (G0, G3) which in 2-out-of-5 code produces the digit sum 6 as a weight 0 bit and a weight 6 bit. Block 1319 functions as a —OR Inverter block, producing the +*s* signal R0.

Blocks 1303–1318 in FIG. 13*a* similarly operate to produce weight 0 bit signals via block 1319 for respective sums 6, 3, 6, 1, 2 and 3 as determined by the applied summation function terms. Block 1303 is effective for additions 1+5 and 2+4 which produce the sum 6. Blocks 1304 and 1305 include the 0 term as input to produce weight 0 bits R0 in respective additions 3+0 and 6+0. Blocks 1303–1308 recognize summation functions which produce sums smaller than 10, generating no carry.

Blocks 1309–1318 produce sum digit eight 0 bits for respective additions 6+6; 8+8; 2+9 or 3+8 or 5+6; 4+8 or 5+7; 4+7; 3+9; 4+9; 5+8; 6+7 and 7+9. In each of these additions there is to be a carry out.

Each block 1301–1318 in FIG. 13*a* has an output arrow labeled R1, R2, R3 or R6. This arrow indicates a fan-out to the —OR block which produces the appropriate weight bit. For convenience in understanding, the entire block is shown (dotted) in the appropriate weight bit function combiner circuit. For example, block 1313 combines terms G1, P6, P3 for the 7+4 addition sum 1 and carry. Block 1313 output becomes input to R0 —OR block 1319 and also to R1 —OR block 1335 in FIG. 13*b*, to produce the 1 digit raw sum in the form (R0, R1) called for by the 2-out-of-5 code, as shown in FIG. 5.

Figure 13B:
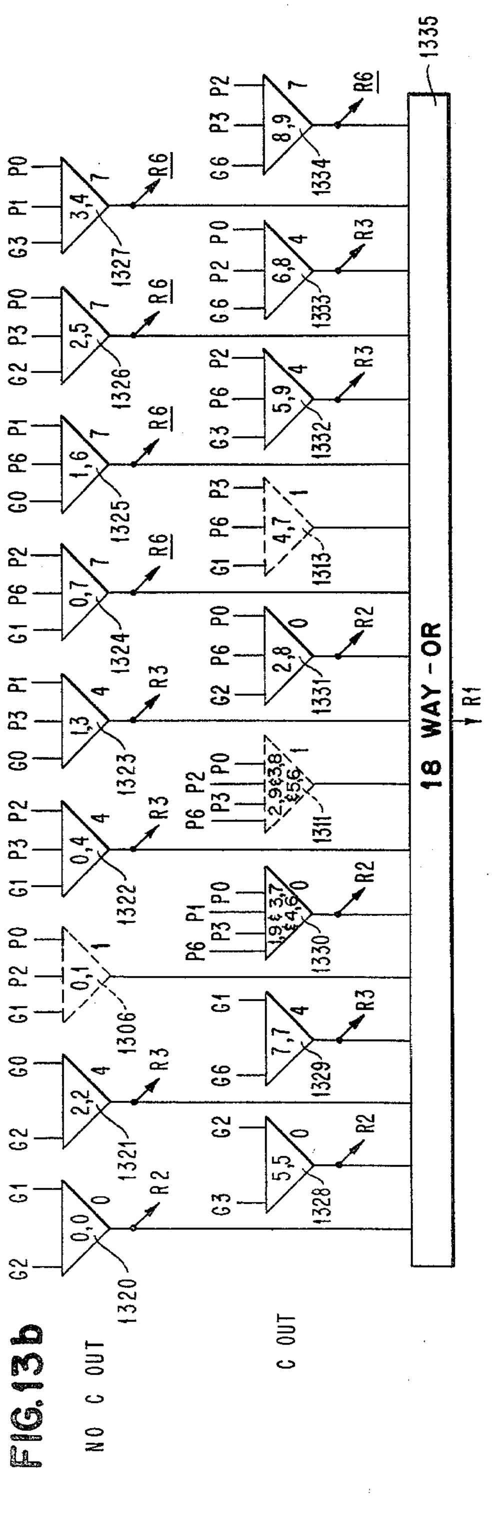

FIG. 13*b* shows the function combiner for the raw sum weight 1 bit R1. Terms which, combined, produce summation functions for digit sums including the weight 1 bit are applied in appropriate combinations to blocks 1320–1334. Blocks 1306, 1311, and 1313, which are common to FIGS. 13*a* and 13*b* are shown dotted. Blocks 1320–1334 produce outputs to appropriate —OR circuits for raw sum bit weights R2, R3 and R6. Block 1335 acts as a multi-input —OR block to produce +*s* R1 signals.

Figure 13C:
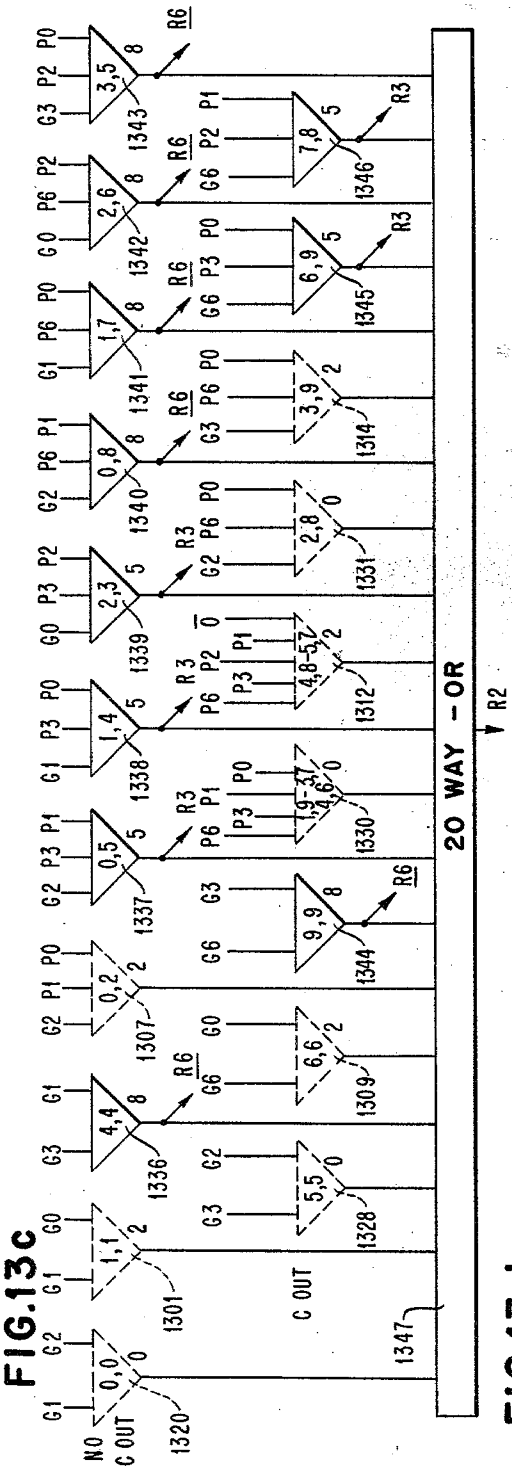
Figure 13D:
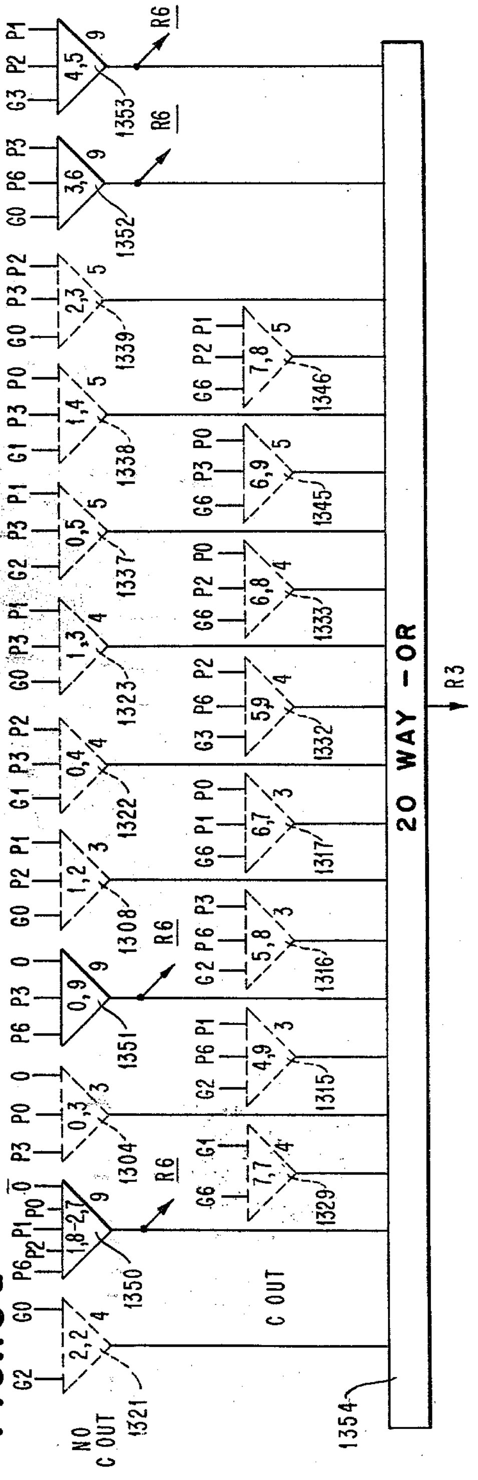
Figure 13E:
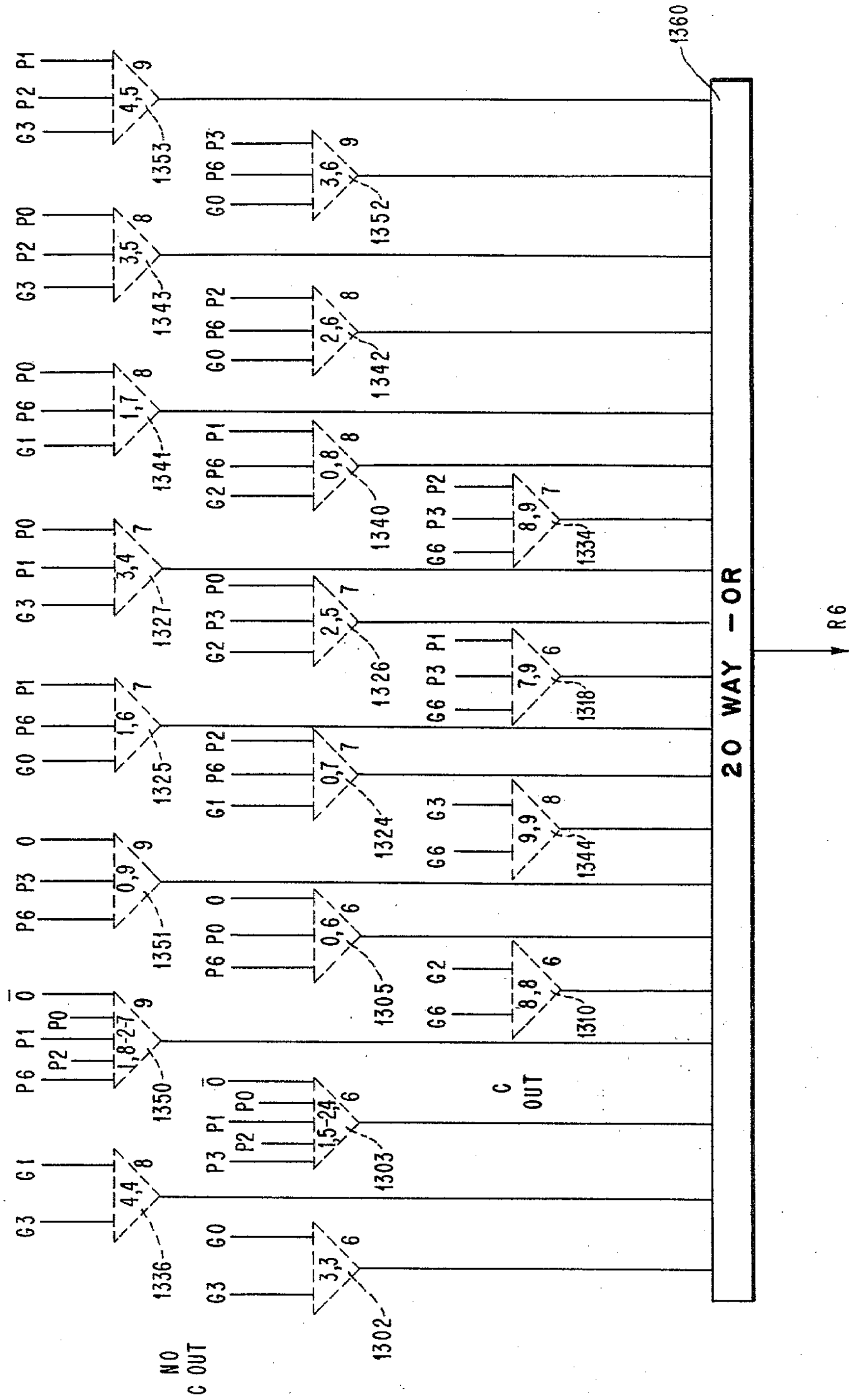
Figures 14A, 14B, 14C, 14D, 14E:
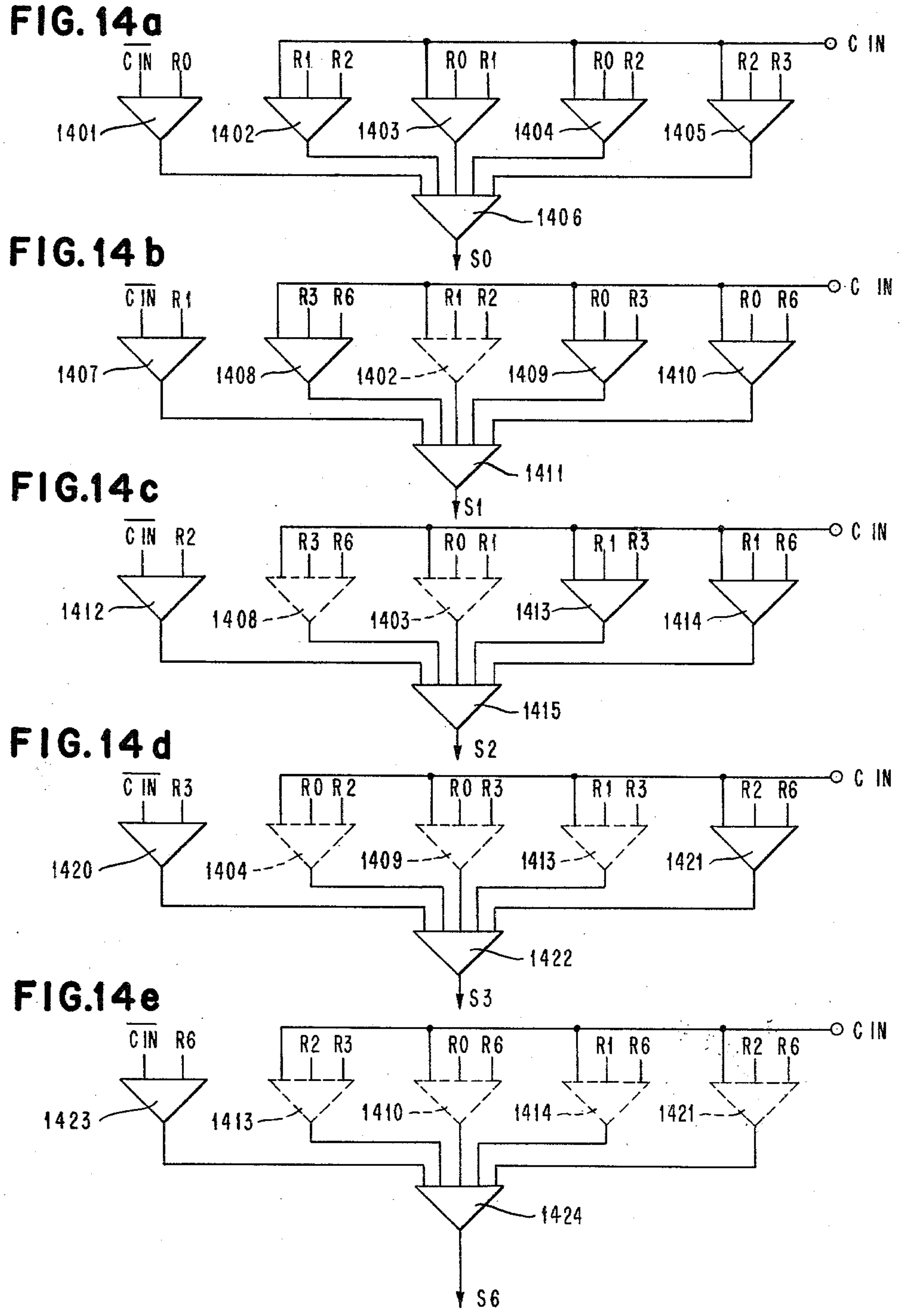

FIGS. 13*c*, 13*d* and 13*e* are similar to FIG. 13*b*. Summation function —*s* outputs from appropriate blocks produce raw sum weight bits R2, R3 and R6 for sums in which these weights are to appear. The decimal digits which produce a particular summation function appear within the stroke block; the modulo 10 sum appears to the right of the output line; the input terms are labeled in terms of G*i*, P*i*, 0 and $\overline{0}$.

FIG. 8 shows the 55 possible summation functions of 2-out-of-5 decimal code. To produce two weight bit signals for each function directly, 110 summation function connections are required. The summation function for 5+1 and 4+2 is identical, however, as are the following:

8+1 and 7+2
9+1 and 7+3 and 6+4
9+2 and 7+4 and 6+5
8+4 and 7+5

This reduces the required summation function list to 48. Two-out-of-five code requires two weight bit connections per summation function, or 96 summation function output connections. FIGS. 13*a* and 13*b* have 18 summation function output connections each; FIGS. 13*c* 13*d* and 13*e* each have 20 connections. It is advantageous that these connections be minimized, not only for original economy, but to facilitate fault detection by preventing possible fault masking where a redundant term might otherwise compensate for a fault in a non-redundant term.

*FIG. 14.—Carry adjust*

The stroke blocks in FIGS. 14*a*–14*e* receive raw sum bit weight inputs R0, R1, R2, R3 and R6 and provide final sum bit weight outputs S0, S1, S2, S3 and S6. A carry in signal C IN or its complement $\overline{\text{C IN}}$ appears from the carry lookahead block. The $\overline{\text{C IN}}$ situation is simple. Blocks 1401, 1407, 1412, 1420 and 1423 function as AND circuits with $\overline{\text{C IN}}$ and respectively R0, R1, R2, R3 and R6 as inputs. The —*s* outputs pass to respective stroke blocks 1406, 1411, 1415, 1422 and 1424 to produce +*s* weight bit signals S0, S1, S2, S3 and S6.

For the C IN situation, the carry adjust mechanism function as a +1 adder, or "one-upper." FIG. 5 shows that decimal digits 0, 1, 2 and 5, when "one-upped," are to contain the weight 0 bit. Blocks 1402–1405 have a C IN input each and respectively have bit weight inputs for decimal digits 0, 1, 2 and 5. Block 1406 functions as a —OR block to produce +*s* S0 signals where the weight signals where the weight 0 bit is to appear in the final sum.

Similarly, blocks 1408, 1402, 1409 and 1410 function via block 1411 to produce +*s* S1 signals for C IN and decimal inputs, 9, 0, 3 and 6, which, when "one-upped" are to contain the weight 1 bit in the final sum.

Blocks 1408, 1403, 1413 and 1414 produce S2 via block 1415 for C IN and decimal 9, 1, 4 and 7, which, when "one-upped" are to contain the weight 2 bit S2. Blocks 1404, 1409, 1413 and 1421 produce S3 via block 1422 for C IN and decimal 2, 3, 4 and 8; blocks 1413, 1414 and 1421 produce S6 via block 1424 for C IN and decimal 5, 6, 7 and 8.

*FIG. 15.—Error check*

Blocks 1501–1509 combine to check the lookahead carry signal C OUT 4 against function combiner and raw sum situations where a carry is known to occur. Blocks 1506–1509 form the compare Exclusive OR network 315 of FIG. 3—an output from block 1505 (functioning as carry duplicate OR circuit 314 in FIG. 3) unaccompanied by the C OUT 4 signal at terminal 1510 is the basic error possibility, although C OUT 4 unaccompanied by block 1505 output is also checked for.

Block 1408 indicates the occurrence of a carry where the raw sum is decimal 9 and a C IN occurs. This is the propagated carry, or the simultaneous adder counterpart of the ripple carry.

Block 1501 inverts R6 to Produce $\overline{\text{R6}}$ as input to block 1502. (The techniques outlined under the subhead FIG. 11.—Summation Function G*i* Generator for eliminating inverters in favor of bundling techniques may eliminate the need for an actual block 1501 so long as $\overline{\text{R6}}$ is available.) A carry should occur whenever a P6 term fails to remain in the raw sum as R6. P6 indicates a weight 6 in the operands, or decimal 6, 7, 8 or 9. To eliminate P6 from the raw sum, the raw sum must be at least 10; hence a carry is apparent.

Block 1503 indicates a carry from the addition of decimal 5+5; block 1504 indicate a carry from addition of decimal 9+9, 8+8, 9+8, 9+7, 6+6, 6+7, 6+8, 6+9, 7+7 or 7+8, which retains a redundant P6 term as well as the R6 term.

Blocks 1408, 1501, 1502, 1503, and 1504 thus indicate all carry situations; they feed block 1505 which acts as carry duplicate OR circuit 314 of FIG. 3. Block 1505 produces a duplicate carry signal. The duplicate carry signal is compared (Exclusive OR) with the lookahead carry signal.

The exact circumstances of the Exclusive OR determination are detailed in copending commonly assigned U.S. patent application, Serial Number 076,641, (D–7436), filed December 19, 1960, Boyle, Digital Computing Apparatus, etc.

Should the duplicate carry signal appear alone (an error) as a +*s* signal, the transistor in block 1506 remains conditioned for conduction by the lookahead carry —*s* signal. Output of block 1506 is +*s*, since it functions as a —OR inverter. The transistor in block 1507 thus is deconditioned (cut off) by +*s* at each input; it functions as a +AND inverter, producing a —*s* signal. The —*s* output of block 1507 conditions the transistor in block 1509 for conduction; block 1509 functions as a —OR inverter, producing a +*s* error signal at its output.

Should both duplicate carry and lookahead carry (+*s*) signals appear together (correct operation), the block 1506 transistor is deconditioned (cut off) producing a —*s* signal. The —*s* output of block 1506 conditions the transistors in blocks 1507 and 1508 for conduction; blocks 1507 and 1508 produce +*s* outputs, which are fed as inputs to block 1509. The coincidence of +*s* at both inputs of block 1509 deconditions its transistor, cutting off conduction, and providing a —*s* (no error) signal as output from block 1509.

Should the lookahead carry signal +*s* appear alone (error), block 1506 and 1507 transistors are conditioned and block 1508 transistor is deconditioned. The —*s* output of block 1508 conditions block 1509 for conduction, providing the +*s* error signal as block 1509 output.

The only other situation is the —*s* signal (not duplicate carry) together with the —*s* signal (not lookahead carry), a correct situation. Blocks 1506, 1507 and 1508 are conditioned for transistor conduction; the outputs of blocks 1507 and 1508 provide +*s* inputs to block 1509. The coincidence of +*s* inputs deconditions the transistor in block 1509, cutting it off to provide the —*s* (no error) output from block 1509.

*Résumé.—See FIGS. 3 and 8*

The adder operates by generating P (OR) and G (AND) summation function terms of the bit-by-bit relationships of the applied operand digits in summation function term generator 308, combining P and G terms into summation functions in combiner 309, and encoding from summation functions to produce a raw sum.

Two-out-of-five code involves bit weights 0, 1, 2, 3 and 6. Two, three or four P terms P0, P1, P2, P3 and P6 appear in any digit addition situation, depending upon the identity, similarity or dissimilarity of addend digit and augend digit bit structures. Two, one or zero G terms G0, G1, G2, G3, G6 appear in digit addition situations depending upon addend digit and augend digit identity, similarity or dissimilarity. Fifty-five summation functions cover all addition situations for two digits in 2-out-of-5 code. Seven functions, duplicates of other functions, produce duplicate sums even though generated by distinct additions. The duplicates are eliminated; 48 distinct summation functions suffice.

Carry adjust block 310 alters the raw sum bit structure (R0, R1, R2, R3 and R6) by lookahead carry values to form the final sum (S0, S1, S2, S3 and S6).

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A multi-digit parallel adder, having a plurality of digit positions, for producing a final sum of a plurality of applied multi-digit coded operands each digit of which is represented by a multi-bit code group of a type wherein the several bits of the code group do not each represent successive orders of a number system, comprising:

(a) carry lookahead mechanism for producing simultaneous digit lookahead carry signals in response to applied operand values;

(b) a summation function term generator for producing bit-by-bit summation function terms for each digit position in response to applied operand digit bit signals;

(c) a summation function term combiner responsive to a set of combinations of summation function terms from said summation function term generator for producing a set of raw sum summation function signals for each digit position;

(d) an encoder responsive to said summation function term combiner to produce coded raw sum digits corresponding to the applied digit raw sum summation function signals; and (e) carry adjust mechanism for each digit position, responsive jointly to said carry lookahead mechanism and to said encoder to alter the bit structure of the respective raw sum digits by the value of the digit lookahead carries and thus produce a multi-digit final sum.

2. The invention according to claim 1, wherein said summation function term generator (b) produces bit-by-bit P term signals according to the logical OR of corresponding bits of the operands, and produces bit-by-bit G term signals according to the logical AND of corresponding bits of the operands, and wherein said summation function term combiner (c) responds to a predesignated set of combinations of the P and G term signals to produce a set of raw sum summation functions.

3. The invention according to claim 2, wherein the adder functions in weighted 2-out-of-5 decimal code of bit weights 0, 1, 2, 3, and 6 (decimal 0 coded 1, 2);

wherein summation function term generator (b) produces P and G terms designated P0, P1, P2, P3 and P6 and G0, G1, G2, G3 or G6, according to the relationship between the related bit weight of the operands, and also produces decimal 0 and decimal $\bar{0}$ (not zero) terms;

wherein said summation function term combiner (c) produces the following summation functions and said encoder (d) produces appropriate decimal raw sum bit structures for the additions of the indicated decimal digits applied to said summation function term generator (b):

| Summation Function | Decimal Digits | Decimal Raw Sum |
|---|---|---|
| G1, G2 | 0+0 | 0 |
| G1, P0, P2 | 0+1 | 1 |
| G2, P0, P1 | 0+2 | 2 |
| P0, P3, 0 | 0+3 | 3 |
| G1, P2, P3 | 0+4 | 4 |
| G2, P1, P3 | 0+5 | 5 |
| P0, P6, 0 | 0+6 | 6 |
| G1, P2, P6 | 0+7 | 7 |
| G2, P1, P6 | 0+8 | 8 |
| P3, P6, 0 | 0+9 | 9 |
| G0, G1 | 1+1 | 2 |
| G0, P1, P2 | 1+2 | 3 |
| G0, P1, P3 | 1+3 | 4 |
| G1, P0, P3 | 1+4 | 5 |
| P0, P1, P2, P3, $\bar{0}$ | (1+5), (2+4) | 6 |
| G0, P1, P6 | 1+6 | 7 |
| G1, P0, P6 | 1+7 | 8 |
| P0, P1, P2, P6, $\bar{0}$ | (1+8), (2+7) | 9 |
| P0, P1, P3, P6 | (1+9), (3+7), (4+6) | 0* (Carry) |
| G0, G2 | 2+2 | 4 |
| G0, P2, P3 | 2+3 | 5 |
| G2, P0, P3 | 2+5 | 7 |
| G0, P2, P6 | 2+6 | 8 |
| G2, P0, P6 | 2+8 | 0* |
| P0, P2, P3, P6 | (2+9), (3+8), (5+6) | 1* |
| G0, G3 | 3+3 | 6 |
| G3, P0, P1 | 3+4 | 7 |
| G3, P0, P2 | 3+5 | 8 |
| G0, P3, P6 | 3+6 | 9 |
| G3, P0, P6 | 3+9 | 2* |
| G1, G3 | 4+4 | 8 |
| G3, P1, P2 | 4+5 | 9 |
| G1, P3, P6 | 4+7 | 1* |
| P1, P2, P3, P6, $\bar{0}$ | (4+8), (5+7) | 2* |
| G3, P1, P6 | 4+9 | 3* |
| G2, G3 | 5+5 | 0* |
| G2, P3, P6 | 5+8 | 3* |
| G3, P2, P6 | 5+9 | 4* |
| G0, G6 | 6+6 | 2* |
| G6, P0, P1 | 6+7 | 3* |
| G6, P0, P2 | 6+8 | 4* |
| G6, P0, P3 | 6+9 | 5* |
| G1, G6 | 7+7 | 4* |
| G6, P1, P2 | 7+8 | 5* |
| G6, P1, P3 | 7+9 | 6* |
| G2, G6 | 8+8 | 6* |
| G6, P2, P3 | 8+9 | 7* |
| G3, G6 | 9+9 | 8* |

4. The invention according to claim 1 comprising, in addition, (f) duplicate carry signal means to produce digit duplicate carry signals in response to summation functions known to result in digit carry situations; and (g) error detection means to compare respective digit duplicate carry signals with the related lookahead carry signals and to produce a carry error designation signal upon mismatch.

5. An adder for producing the raw sum of an applied plurality of digits each of which is represented by a multi-bit code group of a type wherein the several bits of the code group do not each represent successive orders of a number system, comprising:

(a) a summation function term generator for producing bit-by-bit summation function term signals correlating the applied digits; and (b) a summation function term combiner connected to said summation function term generator, responsive to a set of combinations of summation function terms from said summation function term generator for producing a significant raw sum digit summation function signal defining the sum of the applied digits.

6. An adder according to claim 5, wherein said summation function term generator (a) includes two symmetrical logical function term signal generators for each bit position, and wherein said summation function term combiner comprises a logic block for each significant raw sum digit summation function, with connections to said summation function term generator such that each of said logic blocks is responsive to a distinct combination of summation function term signals to produce the raw sum digit summation function signal defining the sum of the applied digits.

7. An adder according to claim 6, wherein the two symmetrical logical function term signal generators for each bit position are means for generating a logical AND function and means for generating logical OR function.

8. A computer system comprising:

(A) a first operand bus;
(B) a second operand bus;
(C) a sum bus;
(D) validity check means associated with said sum bus for signalling error upon default of m-out-of-n code rules; and
(E) a multi-digit parallel adder connected to said first operand, second operand and sum buses, having a plurality of digit positions for producing a final sum on said sum bus of operands presented on said operand buses, the adder being arranged to add digits each of which is represented by a multi-bit code group of a type wherein the several bits of the code group do not each represent successive orders of a number system and comprising:
  (a) carry lookahead mechanism for producing simultaneous digit lookahead carry signals in response to applied operand values;
  (b) a summation function term generator for producing bit-by-bit summation function terms for the several bits of the multi-bit code group of each digit position in response to applied operand digit bit structures;
  (c) a summation function term combiner responsive to a set of combinations of summation function terms from said summation function term generator for producing a set of raw sum digit summation function signals for each digit position;
  (d) an encoder responsive to said summation function term combiner to produce coded raw sum digits corresponding to the applied raw sum digit summation function signals; and
  (e) carry adjust mechanism for each digit position, responsive jointly to said carry lookahead mechanism and to said encoder to alter the bit structure of the respective raw sum digits by the value of the digit lookahead carries and thus produce a multi-digit final sum;
  (f) duplicate carry signal means to produce digit duplicate carry signals in response to summation functions known to result in digit carry situations; and
  (g) error detection means to compare respective digit duplicate carry signals with the related lookahead carry signals and to produce a carry error designation signal upon mismatch;

whereby fault detection in the adder is a function of the carry error designation signal and of the sum bus validity check.

9. A 2-out-of-5 coded decimal computer system comprising:

(A) a first operand bus;
(B) a second operand bus;
(C) a sum bus;
(D) a validity check means associated with said sum bus for signalling error upon default of 2-out-of-5 code rules, and
(E) an adder connected to said first operand, second operand and sum buses for producing a final sum on said sum bus in 2-out-of-5 code in response to digit signals applied via said operand buses; the added comprising:
  (a) carry mechanism for producing carry designations in response to carry out situations from previous orders;
  (b) a summation function term generator for producing logical AND and OR correlations between equal weight addend and augend 2-out-of-5 bits as follows:

OR—P0, P1, P2, P3, P6
AND—G0, G1, G2, G3, G6, and including terms 0 and $\bar{0}$ (not zero) for digits coded by weights 1 and 2;
  (c) a summation function term combiner connected to said summation function term generator for producing raw sum digit summation function signals for the addend and augend decimal digits applied to said summation function term generator to produce the decimal raw sums as follows:

| Summation Function | Decimal Digits | Decimal Raw Sum |
|---|---|---|
| G1, G2 | 0+0 | 0 |
| G1, P0, P2 | 0+1 | 1 |
| G2, P0, P1 | 0+2 | 2 |
| P0, P3, 0 | 0+3 | 3 |
| G1, P2, P3 | 0+4 | 4 |
| G2, P1, P3 | 0+5 | 5 |
| P0, P6, 0 | 0+6 | 6 |
| G1, P2, P6 | 0+7 | 7 |
| G2, P1, P6 | 0+8 | 8 |
| P3, P6, 0 | 0+9 | 9 |
| G0, G1 | 1+1 | 2 |
| G0, P1, P2 | 1+2 | 3 |
| G0, P1, P3 | 1+3 | 4 |
| G1, P0, P3 | 1+4 | 5 |
| P0, P1, P2, P3, $\bar{0}$ | (1+5), (2+4) | 6 |
| G0, P1, P6 | 1+6 | 7 |
| G1, P0, P6 | 1+7 | 8 |
| P0, P1, P2, P6, $\bar{0}$ | (1+8), (2+7) | 9 |
| P0, P1, P3, P6 | (1+9), (3+7), (4+6) | 0* (Carry) |
| G0, G2 | 2+2 | 4 |
| G0, P2, P3 | 2+3 | 5 |
| G2, P0, P3 | 2+5 | 7 |
| G0, P2, P6 | 2+6 | 8 |
| G2, P0, P6 | 2+8 | 0* |
| P0, P2, P3, P6 | (2+9), (3+8), (5+6) | 1* |
| G0, G3 | 3+3 | 6 |
| G3, P0, P1 | 3+4 | 7 |
| G3, P0, P2 | 3+5 | 8 |
| G0, P3, P6 | 3+6 | 9 |
| G3, P0, P6 | 3+9 | 2* |
| G1, G3 | 4+4 | 8 |
| G3, P1, P2 | 4+5 | 9 |
| G1, P3, P6 | 4+7 | 1* |
| P1, P2, P3, P6, $\bar{0}$ | (4+8), (5+7) | 2* |
| G3, P1, P6 | 4+9 | 3* |
| G2, G3 | 5+5 | 0* |
| G2, P3, P6 | 5+8 | 3* |
| G3, P2, P6 | 5+9 | 4* |
| G0, G6 | 6+6 | 2* |
| G6, P0, P1 | 6+7 | 3* |
| G6, P0, P2 | 6+8 | 4* |
| G6, P0, P3 | 6+9 | 5* |
| G1, G6 | 7+7 | 4* |
| G6, P1, P2 | 7+8 | 5* |
| G6, P1, P3 | 7+9 | 6* |
| G2, G6 | 8+8 | 6* |
| G6, P2, P3 | 8+9 | 7* |
| G3, G6 | 9+9 | 8* |

(d) an encoder connected to said summation function term combiner to produce coded raw sum digit bit signals R0, R1, R2, R3, R6 corresponding to the applied raw sum digit summation function signals;
  (e) carry adjust mechanism connected to said carry mechanism (a) to alter the bit structure of the raw sum by the carry value and thus produce final sum digits S0, S1, S2, S3, S6;
  (f) duplicate carry signal means to produce digit duplicate carry signals in response to summation functions known to result in digit carry situations; and
  (g) error detection means to compare respective digit duplicate carry signals with the related lookahead carry signals and to produce a carry error designation signal upon mismatch, whereby fault detection in the adder is a function of the carry error designation signal and of the sum bus validity check.

10. A device for adding digits each of which is represented by a multi-bit code group of a type wherein the several bits of the code group do not each represent successive orders of a number system comprising:

(a) a summation function term generator for producing a plurality of summation function terms each characteristic of a predetermined logical combination of one corresponding bit from each of the multi-bit code groups representing the two digits to be added;

(b) means for combining said plurality of summation function terms to produce a summation function code group characteristic of a raw sum of the two digits;

(c) means for decoding said summation function code group to produce a multi-bit code group representing a raw sum digit in the same multi-bit code in which the two operand digits are represented;

(d) means for signalling whether the addition of said digits produces a carry to a next higher order;

(e) means for signalling whether a carry from a next lower order is present; and (f) means responsive to a carry signal from a next lower order to adjust said raw sum code group to produce a final sum taking into account a carry from the next lower order.

11. An adder for producing a sum digit of two applied digits, each digit being represented by a set of concurrent binary bits, each binary bit of the set having a predetermined numerical weight, comprising:

(a) a summation function term generator connected to receive said applied digits for combining and producing, for the equally weighted bits of the sets, summation function term signals; and (b) a summation function term combiner, including a plurality of logic blocks, each logic block being connected to said summation function term generator and responsive to unique combinations of said summation function term signal for producing a signal defining said sum digit.

References Cited by the Examiner

UNITED STATES PATENTS

| | | | |
|---|---|---|---|
| 2,879,001 | 3/59 | Weinberger et al. | 235—175 |
| 2,957,626 | 10/60 | Havens et al. | 235—153 |
| 2,966,305 | 12/60 | Rosenberger | 235—175 |
| 2,991,009 | 7/61 | Saxenmeyer | 235—153 |
| 3,037,698 | 6/62 | Saxenmeyer | 235—153 |

MALCOLM A. MORRISON, *Primary Examiner.*

WALTER W. BURNS, Jr., *Examiner.*

UNITED STATES PATENT OFFICE
CERTIFICATE OF CORRECTION

Patent No. 3,196,260 July 20, 196

John M. Pugmire

It is hereby certified that error appears in the above numbered patent requiring correction and that the said Letters Patent should read as corrected below.

In the drawings, Sheets 1 to 14, line 2, and in the head to the printed specification, line 2, title of invention, for "ADDER", each occurrence, read -- ADDER UTILIZING ENCODER AND DECODER FOR DEVELOPING A SUM DIGIT --; column 9, line 49, for "10b" read -- 10a --; column 15, line 46, for "digit raw sum" read -- raw sum digit --; column 17, line 58, strike out "a"; column 20, line 7, for "signal" read -- signals --.

Signed and sealed this 8th day of February 1966.

(SEAL)
Attest:

ERNEST W. SWIDER
Attesting Officer

EDWARD J. BRENNER
Commissioner of Patents